(12) United States Patent
Jiang et al.

(10) Patent No.: US 9,998,872 B2
(45) Date of Patent: Jun. 12, 2018

(54) METHODS AND SYSTEMS FOR RETURNING AN EARLY POSITIONING FIX

(71) Applicant: QUALCOMM Incorporated, San Diego, CA (US)

(72) Inventors: Yongjin Jiang, San Diego, CA (US); Stephen William Edge, Escondido, CA (US); Kirk Allan Burroughs, Alamo, CA (US); Sven Fischer, Nuremberg (DE); Ie-Hong Lin, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 14/581,580

(22) Filed: Dec. 23, 2014

(65) Prior Publication Data

US 2015/0230057 A1    Aug. 13, 2015

Related U.S. Application Data

(60) Provisional application No. 62/033,617, filed on Aug. 5, 2014, provisional application No. 61/938,694, filed on Feb. 12, 2014.

(51) Int. Cl.
*H04W 4/02* (2009.01)
*H04W 4/22* (2009.01)
(Continued)

(52) U.S. Cl.
CPC .......... *H04W 4/025* (2013.01); *G01S 5/0263* (2013.01); *H04W 4/22* (2013.01); *H04W 64/00* (2013.01);
(Continued)

(58) Field of Classification Search
CPC ....... G01S 5/0263; H04W 4/025; H04W 4/22; H04W 64/00; H04W 88/005
See application file for complete search history.

(56) References Cited

U.S. PATENT DOCUMENTS 9,699,607 B2 *   7/2017   Markhovsky ......... H04W 4/023
2005/0024265 A1   2/2005   Stilp et al.
(Continued)

OTHER PUBLICATIONS

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10)", 3GPP Standard; 3GPP TS 36.305, 3rd Generation Partnership Project (3GPP), Mobile Competence Centre; 650, Route Des Lucioles; F-06921 Sophia-Antipolis Cedex; France, No. V10.0.0, Dec. 17, 2010 (Dec. 17, 2010), pp. 1-51, XP050462121, [retrieved on Dec. 17, 2010].
(Continued)

*Primary Examiner* — Liton Miah
(74) *Attorney, Agent, or Firm* — Berkeley Law & Technology Group, LLP

(57) ABSTRACT

Disclosed are methods and systems for supporting positioning operations in a cellular communication network including locating a mobile device in response to an emergency event. In one particular implementation, a first position fix may be provided quickly by a mobile device and may be followed by a second, more accurate, position fix at a later time. In particular implementations, the first and second position fixes may be provided using the 3GPP Long Term Evolution (LTE) Positioning Protocol (LPP) as part of a single LPP transaction and may further be provided using a user plane or control plane location solution.

18 Claims, 22 Drawing Sheets

(51) Int. Cl.
*H04W 64/00* (2009.01)
*G01S 5/02* (2010.01)
*H04W 88/00* (2009.01)

(52) U.S. Cl.
CPC ......... *G01S 5/0205* (2013.01); *H04W 88/005* (2013.01)

(56) References Cited

U.S. PATENT DOCUMENTS

| | | |
|---|---|---|
| 2006/0276168 A1 | 12/2006 | Fuller, Jr. et al. |
| 2007/0004378 A1 | 1/2007 | Muhonen |
| 2008/0268869 A1 | 10/2008 | Lamba et al. |
| 2011/0269477 A1 | 11/2011 | Annamalai et al. |
| 2012/0258733 A1* | 10/2012 | Fischer ................ H04W 4/20 455/456.1 |
| 2012/0306691 A1* | 12/2012 | Werner ................ G01S 19/46 342/357.29 |
| 2013/0079039 A1* | 3/2013 | Heikkilae ............ H04W 4/025 455/456.6 |
| 2013/0150085 A1 | 6/2013 | Jin et al. |
| 2013/0203447 A1* | 8/2013 | Hannan ................ G01S 5/0205 455/456.5 |

OTHER PUBLICATIONS

"Secure User Plane Location Architecture; OMA-AD-SUPL-V2_0-20080430-D", OMA-AD-SUPL-V2_0-20080430-D, Open Mobile Alliance (OMA), 4330 La Jolla Village Dr., Suite 110, San Diego, CA, 92122; USA, No. 2.0, Apr. 30, 2008 (Apr. 30, 2008), pp. 1-55, XP064089494, Retrieved from the Internet: URL: ftp/Public_documents/LOC/2008/[retrieved on May 7, 2008].

International Search Report and Written Opinion—PCT/US2015/015501—ISA/EPO—dated Aug. 17, 2015.

3GPP TS 36.355, "3rd Generation Partnership Project; Technical Specification Group Radio Access Network; Evolved Universal Terrestrial Radio Access (E-UTRA); LTE Positioning Protocol (LPP) (3GPP TS 36.355 version 12.3.0 Release 12)", 3GPP TS 36.355, 650, Route Des Lucioles; F-06921 Sophia-Antipolis ; France, val. 3GPP RAN 2, No. V12.3.0, Dec. 2014, 126 Pages.

\* cited by examiner

METHODS AND SYSTEMS FOR RETURNING AN EARLY POSITIONING FIX

CROSS-REFERENCE TO RELATED APPLICATIONS

This application claims the benefit of U.S. Provisional Application No. 61/938,694, entitled "Methods and Systems for Returning an Early Positioning Fix," filed Feb. 12, 2014 and U.S. Provisional Application No. 62/033,617, entitled "Methods and Systems for Returning an Early Position Fix," filed Aug. 5, 2014, both of which are assigned to the assignee hereof and which are expressly incorporated herein by reference.

BACKGROUND

Field

Embodiments described herein are directed to positioning operations applicable to support of emergency and commercial location related services.

Information

The global positioning system (GPS) and other like satellite and terrestrial positioning systems have enabled navigation services for mobile handsets in outdoor environments. Likewise, particular techniques for obtaining estimates of positions of a mobile device may enable enhanced location based services in particular indoor venues such as residential, governmental or commercial venues. In particular applications, for example, location based services may support one or more emergency services such as dispatching an emergency response to a location of a mobile device. In existing systems, an accurate location of a mobile device may be obtained using GPS or other positioning techniques, but the accurate position fix may take significant time—e.g. 30 seconds or more. In some cases, for example, routing emergency calls to a Public Safety Answering Point (PSAP) or determining an initial approximate location of an emergency caller for dispatch of public safety, may need a position fix more quickly. There may thus be a benefit to techniques that enable an early position fix to be provided in advance of a subsequent more accurate location fix.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
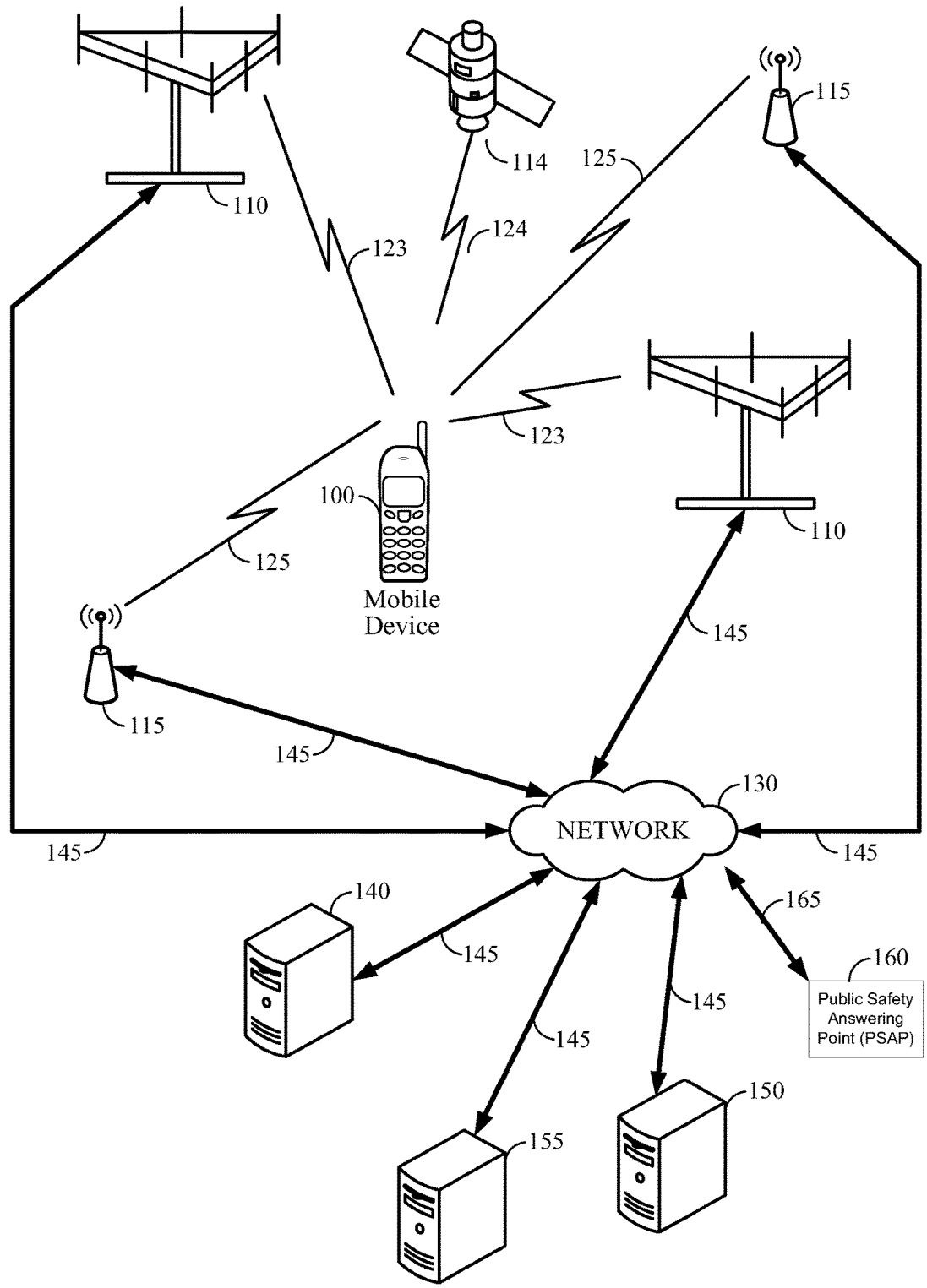
FIG. 1 is a system diagram illustrating certain features of a system containing a mobile device, in accordance with an implementation.

Briefly, a particular implementation is directed to a method at a mobile device comprising: receiving a first message from a location server, wherein the first message comprises a request for an early position fix; transmitting a second message comprising first location parameters for said early position fix to the location server in response to the first message; and transmitting a third message comprising second location parameters for a final position fix to the location server in response to the first message.

Another particular implementation is directed to a mobile device comprising: a transceiver device for wirelessly transmitting messages to and wirelessly receiving messages from a communication network; and one or more processors to: obtain a first message received at said transceiver device from a location server, wherein the first message comprises a request for an early position fix; initiate transmission of a second message through said transceiver device comprising first location parameters for the early position fix to the location server in response to the first message; and initiate transmission of a third message through said transceiver device comprising second location parameters for a final position fix to the location server in response to the first message.

Another particular implementation is directed to a non-transitory storage medium comprising machine-readable instructions stored thereon which are executable by a special purpose computing apparatus to: obtain a first message received from a location server, wherein the first message comprises a request for an early position fix; initiate transmission of a second message comprising first location parameters for the early position fix to the location server in response to the first message; and initiate transmission of a third message comprising second location parameters for a final position fix to the location server in response to the first message.

Another particular implementation is directed to a mobile device comprising: means for receiving a first message from a location server, wherein the first message comprises a request for an early position fix; means for transmitting a second message comprising first location parameters for the early position fix to the location server in response to the first message; and means for transmitting a third message comprising second location parameters for a final position fix to the location server in response to the first message.

Another particular implementation is directed to a method at a location server for supporting one or more emergency response services, the method comprising: transmitting a first message to a mobile device comprising a location request, wherein the first message comprises a request for an early position fix; receiving a second message from said mobile device transmitted in response to said first message, said second message comprising first location parameters for the early position fix; and receiving a third message from said mobile device transmitted in response to said first message, said third message comprising second location parameters for a final position fix.

Another particular implementation is directed to a location server for supporting one or more emergency response services, the location server comprising: a transceiver device to transmit messages to and receive messages from a communication network; and one or more processors to: initiate transmission of a first message through said transceiver device to a mobile device comprising a location request, wherein the first message comprises a request for an early position fix; obtain a second message received at said transceiver device from said mobile device transmitted in response to said first message, said second message comprising first location parameters for the early position fix; and obtain a third message received at said transceiver device from said mobile device transmitted in response to said first message, said third message comprising second location parameters for a final position fix.

Another particular implementation is directed to a non-transitory storage medium comprising machine-readable instructions stored thereon which are executable by special purpose computing apparatus of a location server, the location server to support one more emergency response services, to: initiate transmission of a first message to a mobile device comprising a location request, wherein the first message comprises a request for an early position fix; obtain a second message received from said mobile device transmitted in response to said first message, said second message comprising first location parameters for the early position fix; and obtain a third message received from said mobile device transmitted in response to said first message, said second message comprising second location parameters for a final position fix.

Another particular implementation is directed to a location server to support one or more emergency response services, the location server comprising: means for transmitting a first message to a mobile device comprising a location request, wherein the first message comprises a request for an early position fix; means for receiving a second message from said mobile device transmitted in response to said first message, said second message comprising first location parameters for the early position fix; and means for receiving a third message from said mobile device transmitted in response to said first message, said third message comprising second location parameters for a final position fix.

Another particular implementation is directed to a method for supporting emergency location of a mobile device at a mobility management entity (MME), the method comprising: receiving a first location request message from a gateway mobile location center (GMLC), the first location request message comprising a request for first location parameters of the mobile device; transmitting a second location request message to an enhanced serving mobile location center (E-SMLC) based, at least in part, on said first location request message; receiving a third location request message from the GMLC, the third location request message comprising a request for second location parameters of the mobile device; transmitting a fourth location request message to the E-SMLC based, at least in part, on the third location request message; receiving a first location response message from the E-SMLC transmitted in response to the fourth location request message, wherein the first location response message comprises location parameters of an early location fix for the mobile device; transmitting a second location response message comprising the early location fix to the GMLC, the early location fix being based, at least in part, on the location parameters of the early location fix for the mobile device, wherein the second location response message is transmitted in response to the third location request message; receiving a third location response message from the E-SMLC transmitted in response to the second location request message, wherein the third location response message comprises location parameters of a final position fix for the mobile device; and transmitting a fourth location response message comprising the final position fix to the GMLC, the final position fix being based, at least in part, on the location parameters of the final position fix, wherein the fourth location response message is transmitted in response to the first location request message.

Another particular implementation is directed to a mobility management entity (MME) to support one more emergency response services, the MME comprising: a transceiver device to transmit messages to and receive messages from a communication network; and one or more processors to: obtain a first location request message received at said transceiver device from a gateway mobile location center (GMLC), the first location request message comprising a request for first location parameters of the mobile device; initiate transmission of a second location request message through said transceiver device to an enhanced serving mobile location center (E-SMLC) based, at least in part, on said first location request message; obtain a third location request message received at said transceiver device from the GMLC, the third location request message comprising a request for second location parameters of the mobile device; initiate transmission of a fourth location request message through said transceiver device to the E-SMLC based, at least in part, on the third location request message; obtain a first location response message received at said transceiver device from the E-SMLC transmitted in response to the fourth location request message, wherein the first location response message comprises location parameters of an early location fix for the mobile device; initiate transmission of a second location response message comprising the early location fix through said transceiver device to the GMLC, the early location fix being based, at least in part, on the location parameters of the early location fix for the mobile device, wherein the second location response message is transmitted in response to the third location request message; obtain a third location response message received at said transceiver device from the E-SMLC transmitted in response to the second location request message, wherein the third location response message comprises location parameters of a final position fix for the mobile device; and initiate transmission of a fourth location response message comprising the final position fix through said transceiver device to the GMLC, the final position fix being based, at least in part, on the location parameters of the final position fix, wherein the fourth location response message is transmitted in response to the first location request message.

Another particular implementation is directed to a non-transitory storage medium comprising computer readable instructions stored thereon which are executable by a special purpose computing apparatus of a mobility management entity (MME), the MME to support one more emergency response services, to: obtain a first location request message received from a gateway mobile location center (GMLC), the first location request message comprising a request for first location parameters of the mobile device; initiate transmission of a second location request message to an enhanced serving mobile location center (E-SMLC) based, at least in part, on said first location request message; obtain a third location request message received from the GMLC, the third location request message comprising a request for second location parameters of the mobile device; initiate transmission of a fourth location request message to the E-SMLC based, at least in part, on the third location request message; obtain a first location response message received from the E-SMLC transmitted in response to the fourth location request message, wherein the first location response message comprises location parameters of an early location fix for the mobile device; initiate transmission of a second location response message comprising the early location fix to the GMLC, the early location fix being based, at least in part, on the location parameters of the early location fix for the mobile device, wherein the second location response message is transmitted in response to the third location request message; obtain a third location response message received from the E-SMLC transmitted in response to the second location request message, wherein the third location response message comprises location parameters of a final position fix for the mobile device; and initiate transmission of a fourth location response message comprising the final position fix to the GMLC, the final position fix being based, at least in part, on the location parameters of the final position fix, wherein the fourth location response message is transmitted in response to the first location request message.

Another particular implementation is directed to a mobility management entity (MME) to support one more emergency response services, the MME comprising: means for receiving a first location request message from a gateway mobile location center (GMLC), the first location request message comprising a request for first location parameters of the mobile device; means for transmitting a second location request message to an enhanced serving mobile location center (E-SMLC) based, at least in part, on said first location request message; means for receiving a third location request message from the GMLC, the third location request message comprising a request for second location parameters of the mobile device; means for transmitting a fourth location request message to the E-SMLC based, at least in part, on the third location request message; means for receiving a first location response message from the E-SMLC transmitted in response to the fourth location request message, wherein the first location response message comprises location parameters of an early location fix for the mobile device; means for transmitting a second location response message comprising the early location fix to the GMLC, the early location fix being based, at least in part, on the location parameters of the early location fix for the mobile device, wherein the second location response message is transmitted in response to the third location request message; means for receiving a third location response message from the E-SMLC transmitted in response to the second location request message, wherein the third location response message comprises location parameters of a final position fix for the mobile device; and means for transmitting a fourth location response message comprising the final position fix to the GMLC, the final position fix being based, at least in part, on the location parameters of the final position fix, wherein the fourth location response message is transmitted in response to the first location request message.

Another particular implementation is directed to a method for supporting location of a mobile device at a mobility management entity (MME), the method comprising: receiving a first location request message from a gateway mobile location center (GMLC), the first location request message comprising a request for a location of the mobile device; transmitting a second location request message to an enhanced serving mobile location center (E-SMLC); receiving a first location response message from the E-SMLC, wherein the first location response message comprises an early location fix for the mobile device; transmitting a location report message comprising the early location fix to the GMLC; receiving a second location response message from the E-SMLC, wherein the second location response message comprises a final position fix for the mobile device; and transmitting a third location response message comprising the final position fix to the GMLC.

Another particular implementation is directed to a mobility management entity (MME) comprising: a transceiver device for transmitting messages to and receiving messages from a communication network; and one or more processors to: obtain a first location request message received at said transceiver device from a gateway mobile location center (GMLC), the first location request message comprising a request for first location parameters of a mobile device; initiate transmission of a second location request message through said transceiver device to an enhanced serving mobile location center (E-SMLC) based, at least in part, on said first location request message; obtain a third location request message received at said transceiver device from the GMLC, the third location request message comprising a request for second location parameters of the mobile device; initiate transmission of a fourth location request message through said transceiver device to the E-SMLC based, at least in part, on the third location request message; obtain a first location response message received at said transceiver device from the E-SMLC transmitted in response to the fourth location request message, wherein the first location response message comprises location parameters of an early location fix for the mobile device; initiate transmission of a second location response message comprising the early location fix to the GMLC, the early location fix being based, at least in part, on the location parameters of the early location fix for the mobile device, wherein the second location response message is transmitted in response to the third location request message; obtain a third location response message received at said transceiver device from the E-SMLC transmitted in response to the second location request message, wherein the second location response message comprises location parameters of a final position fix for the mobile device; and initiate transmission of a fourth location response message comprising the final position fix through the transceiver device to the GMLC, the final position fix being based, at least in part, on the location parameters of the final position fix, wherein the fourth location response message is transmitted in response to the first location request message.

Another particular implementation is directed to a non-transitory storage medium comprising machine-readable instructions stored thereon which are executable by a special purpose computing apparatus of a mobility management entity (MME) to: obtain a first location request message received from a gateway mobile location center (GMLC), the first location request message comprising a request for location parameters of a mobile device; initiate transmission of a second location request message to an enhanced serving mobile location center (E-SMLC) based, at least in part, on said first location request message; obtain a third location request message received from the GMLC, the third location request message comprising a request for second location parameters of the mobile device; initiate transmission of a fourth location request message to the E-SMLC based, at least in part, on the third location request message; obtain a first location response message received from the E-SMLC transmitted in response to the fourth location request message, wherein the first location response message comprises location parameters of an early location fix for the mobile device; initiate transmission of a second location response message comprising an early position fix to the GMLC, the early position fix being based, at least in part, on the location parameters of the early position fix for the mobile device, wherein the second location response message is transmitted in response to the third location request message; obtain a third location response message received from the E-SMLC transmitted in response to the second location request message, wherein the third location response message comprises location parameters of a final position fix for the mobile device; and initiate transmission of a fourth location response message comprising the final position fix to the GMLC, the final position fix being based, at least in part, on the location parameters of the final position fix, wherein the fourth location response message is transmitted in response to the first location request message.

Another particular implementation is directed to a mobility management entity (MME) for supporting emergency response services, comprising: means for receiving a first location request message from a gateway mobile location center (GMLC), the first location request message comprising a request for location parameters of a mobile device based, at least in part, on said first location request message; means for transmitting a second location request message to an enhanced serving mobile location center (E-SMLC); means for receiving a third location request message from the GMLC, the third location request message comprising a request for second location parameters of the mobile device; means for transmitting a fourth location request message to the E-SMLC based, at least in part, on the third location request message; means for receiving a first location response message from the E-SMLC transmitted in response to the fourth location request message, wherein the first location response message comprises location parameters of an early location fix for the mobile device; means for transmitting a second location response message comprising the early location fix to the GMLC, the early location fix being based, at least in part, on the location parameters of the early location fix for the mobile device, wherein the second location response message is transmitted in response to the third location request message; means for receiving a third location response message from the E-SMLC transmitted in response to the second location request message wherein the third location response message comprises location parameters of a final position fix for the mobile device; and means for transmitting a fourth location response message comprising the final position fix to the GMLC, the final position fix being based, at least in part, on the location parameters of the final position fix, wherein the fourth location response message is transmitted in response to the first location request message.

Another particular implementation is directed to a method at a gateway mobile location center (GMLC), the method comprising: receiving a request for a location of a mobile device in association with an emergency service; transmitting a first location request message to a mobility management entity (MME), the first location request message comprising a request for the location of the mobile device and specifying high accuracy or a tolerance for high delay or a combination thereof; transmitting a second location request message to the MME, the second location request message comprising a request for the location of the mobile device and specifying low accuracy or low delay or combination thereof; receiving a first location response message from the MME responsive to the first location request message, the first location response message comprising an early position fix for the mobile device; and receiving a second location response message from the MME responsive to the second location request message, the second location response message comprising a final position fix for the mobile device.

It should be understood that the aforementioned implementations are merely example implementations, and that claimed subject matter is not necessarily limited to any particular aspect of these example implementations.

DETAILED DESCRIPTION

Multiple Public Safety Answering Points (PSAPs) may exist for a large geographic area. Thus, if an emergency call is placed, routing the call to the correct Public Safety Answering Point (PSAP), for example, a PSAP responsible for a particular location, should be completed on a timely basis so that the appropriate emergency operators may determine needs and nature of the emergency call in an expedient manner. Often, the call routing may need to be completed in a more timely manner than may be conducive to determining the most accurate position fix. While a highly accurate position fix may not be immediately available to route the emergency call to the correct PSAP, a less accurate position fix may be quickly performed and may suffice for purposes of call routing to the correct PSAP. Having a prompt, but less accurate, position fix may enable a timely connection between the emergency caller and the correct PSAP. A more accurate position fix may then be completed after the initial call connection is made, enabling the emergency service providers to locate the emergency caller.

In addition, as pointed out earlier, a PSAP may dispatch a response to an emergency event based on a position fix or estimated location of a device that initiates an emergency call. While a highly accurate position fix may not be immediately available to a PSAP, a less accurate position fix may be quickly available to a PSAP. Having such a less accurate position fix may enable a PSAP to at least initiate an emergency response before a more accurate position fix becomes available. A less accurate position fix that is quickly available may thereby be used to help route an emergency call to the correct PSAP and/or assist a PSAP with dispatching an emergency response.

In a particular implementation, a location services (LCS) client or agent may prefer that a user equipment (UE) location estimate with reasonably good accuracy (e.g., as an early-fix) becomes available first, before a final position fix is obtained at the end of an allowed positioning response time using available positioning methods. For example, during a positioning process for Emergency Services call delivery to a PSAP agent in North America, a tier-1 carrier may prefer to obtain an early-fix with some initial accuracy level within several seconds of an emergency call being initiated by a user. Then, sometime later (e.g. approximately 20 seconds later in some embodiments), a final-fix with desired positioning quality for the UE may be preferred.

Current control plane and user plane location solutions applicable to wireless networks of the types defined by the $3^{rd}$ Generation Partnership Project (3GPP) (e.g. GSM, WCDMA and LTE) may not support provision of an early location fix (at an initial accuracy level) followed by a more accurate subsequent location fix in any standardized form. For example, although a 3GPP defined wireless network may obtain two separate position fixes—one fast and less accurate position fix ("early-fix") followed by a later and more accurate position fix ("final-fix")—there may be no means of using information associated with the initial, fast and less accurate location fix to expedite or otherwise improve the second later and more accurate fix. Consequently, the second more accurate location fix may either be less accurate than ultimately desired or be sufficiently accurate but take longer to obtain overall, thereby possibly exceeding any maximum location response time expected by an external client such as a PSAP. Particular implementations described herein may overcome some of the drawbacks of obtaining two separate, independent position fixes that are subsequently correlated in response to an emergency event. The techniques described herein may enable a fast early location fix to be followed by a slower more accurate location fix with little or no impairment in terms of response time or accuracy for the later, more accurate location fix. Techniques discussed herein may be used in association with location of a mobile device that is making an emergency call but may also be applied to location of a mobile device in association with commercial services such as provision of navigation directions, a friend finder service or asset tracking service, just to provide a few examples.

A Control Plane and User Plane location services implementation may allow end-to-end message flows (also referred to as call flows) that request and report the early-fix and the final-fix from a user equipment device (UE) in two separate positioning sessions/transactions in Long Term Evolution (LTE) wireless networks. However, the 3GPP LTE Positioning Protocol (LPP) standard (3GPP Technical Specification (TS) 36.355 that defines a LPP protocol used for positioning of a UE for both user and control plane solutions) specifies that a UE is not required to handle multiple LPP Request Location Information messages specifying use of the same positioning methods. As a consequence in some cases, two positioning sessions/transactions for a corresponding early-fix and final fix may be executed sequentially and not in parallel (otherwise, one of them may be rejected by a standardcompliant UE). This is likely to increase an overall delay for a final position fix. In this context, an LPP session may be established between a location server and a target device (e.g., UE) for the purpose of transferring location parameters such as, for example, positioning assistance data, estimated location of the target device or measurements for use in computing an estimated location of the target device (e.g., observed time difference of arrival (OTDOA) measurements). In the course of an LPP session, one or more LPP transactions may be performed to carry out particular operations (e.g., exchange capabilities descriptions, positioning assistance data or measurements). An LPP transaction may comprise one or more LPP messages exchanged between a location server and a target device that perform a single function (e.g., transfer of LPP capabilities from a target device to a server, provision of assistance data from a server to a target device or transfer of location measurements or a location estimate from a target device to a server). An LPP session in which the location of a target device may be obtained (e.g., by a location server and/or by the target device) may comprise one or more LPP transactions. In one example of an LPP session, a location request for a final position fix may be launched by a location server after completion of a positioning operation for obtaining an early position fix. In this case, measurements obtained by the target device in the course of a positioning operation for obtaining an early-fix may enable a reduction in time for obtaining the highaccuracy final-fix.

To enable end-to-end request and report of early-fix and final-fix in a single LPP positioning session between a location server and a UE, for both Control Plane and User Plane solutions, particular implementations may be directed to changes to, modifications to, additions to or extensions of standardized approaches and additional (explicit and/or implicit) procedures for a UE and associated network nodes on LTE networks. For example, changes, extensions, modifications or additions may be applied to 3GPP TS 36.355 comprising adding a new optional Information Element (IE) in an LPP Request Location Information message, for example. One particular IE may be referred to as a responseTimeEarlyFix and may enable uniquely identifying an early-fix positioning request, and possibly specifying a response time allowed or desired for reporting the early-fix. Changes, modifications, additions or extensions may also be applied to an LCS-AP (Location Services Application Protocol) specification (3GPP TS 29.171) that defines a control plane protocol used in a LTE network between a mobility management entity (MME) and enhanced serving mobile location center (E-SMLC) for positioning of a UE. An LCS-AP change may comprise adding a new message named an LCS-AP Location Report for reporting an early-fix across an $SL_s$ interface between an MME and E-SMLC. Changes to, modifications to or extensions of ATIS-0700015 standard may also enable support of an Emergency Location Immediate Report procedure to transfer an early location fix followed later by a more accurate fix (e.g., as defined in the OMA Mobile Location Protocol (MLP) specification).

As shown in FIG. 1 in a particular implementation, mobile device 100, which may also be referred to as a UE (or user equipment), may transmit radio signals to, and receive radio signals from, a wireless communication network. In one example, mobile device 100 may communicate with a cellular communication network by transmitting wireless signals to, or receiving wireless signals from a cellular transceiver 110 which may comprise a wireless base transceiver subsystem (BTS), a Node B or an evolved NodeB (eNodeB) over wireless communication link 123. Similarly, mobile device 100 may transmit wireless signals to, or receive wireless signals from local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Examples of network technologies that may support wireless communication link 123 are Global System for Mobile Communications (GSM), Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). Here, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, Bluetooth (BT) and LTE.

In a particular implementation, cellular transceiver 110 and local transceiver 115 may communicate with servers 140, 150 and/or 155 over a network 130 through links 145. Here, network 130 may comprise any combination of wired or wireless links and may include cellular transceiver 110 and/or local transceiver 115 and/or servers 140, 150 and 155. In a particular implementation, network 130 may comprise Internet Protocol (IP) or other infrastructure capable of facilitating communication between mobile device 100 and servers 140, 150 or 155 through local transceiver 115 or cellular transceiver 110. In an embodiment, network 130 may also facilitate communication between mobile device 100, servers 140, 150 and/or 155 and a public safety answering point (PSAP) 160, for example through communications link 165) In another implementation, network 130 may comprise cellular communication network infrastructure such as, for example, a base station controller or packet based or circuit based switching center (not shown) to facilitate mobile cellular communication with mobile device 100. In a particular implementation, network 130 may comprise local area network (LAN) elements such as WiFi APs, routers and bridges and may in that case include or have links to gateway elements that provide access to wide area networks such as the Internet. In other implementations, network 130 may comprise a LAN and may or may not have access to a wide area network but may not provide any such access (if supported) to mobile device 100. In some implementations network 130 may comprise multiple networks (e.g., one or more wireless networks and/or the Internet). In one implementation, network 130 may include one or more serving gateways or Packet Data Network gateways. In addition, one or more of servers 140, 150 and 155 may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in network 130.

In particular implementations, and as discussed below, mobile device 100 may have circuitry and processing resources capable of obtaining location related measurements (e.g. for signals received from GPS or other Satellite Positioning System (SPS) satellites 114, cellular transceiver 110 or local transceiver 115 and possibly computing a position fix or estimated location of mobile device 100 based on these location related measurements. In some implementations, location related measurements obtained by mobile device 100 may be transferred to a location server such as an enhanced serving mobile location center (E-SMLC) or SUPL location platform (SLP) (e.g. which may be one of servers 140, 150 and 155) after which the location server may estimate or determine a location for mobile device 100 based on the measurements. In the presently illustrated example, location related measurements obtained by mobile device 100 may include measurements of signals (124) received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110). Mobile device 100 or a separate location server may then obtain a location estimate for mobile device 100 based on these location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 100. Here, servers 140, 150 or 155 may be capable of providing positioning assistance data to mobile device 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, servers 140, 150 or 155 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, a mobile device 100 may obtain measurements of signal strengths for signals received from cellular transceiver 110 and/or local transceiver 115 and/or may obtain a round trip signal propagation time (RTT) between mobile device 100 and a cellular transceiver 110 or local transceiver 115. A mobile device 100 may use these measurements together with assistance data (e.g. terrestrial almanac data or GNSS satellite data such as GNSS Almanac and/or GNSS Ephemeris information) received from a server 140, 150 or 155 to determine a location for mobile device 100 or may transfer the measurements to a server 140, 150 or 155 to perform the same determination. A call from mobile device 100 may be routed, based on the location of mobile device 100, and connected to a Public Safety Answering Point (PSAP) 160, for example, via wireless communication link 123 and communications link 165. PSAP 160 may, in an embodiment, correspond to PSAP 218 or legacy PSAP 220.

A mobile device (e.g. mobile device 100 in FIG. 1) may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

As pointed out above, in response to an emergency event, a location of a mobile device may be determined based, at least in part, on two position fixes, an "early position fix" and a "final position fix." In this context, an early position fix is provided to an entity responding to an event at a time preceding the availability of a final position fix. In one particular implementation, an early position fix may be determined according to or subject to a time constraint. For example, an early position fix may comprise best available measurements or estimated location of a mobile device of interest at a particular specified time following an emergency event. In another particular implementation, a final position fix may comprise measurements or an estimated location of a mobile device in question meeting or exceeding a particular specified accuracy.

The network architecture described previously in relation to FIG. 1 may be considered as a generic architecture that can fit a variety of outdoor and indoor location solutions including the standard SUPL user plane location solution defined by the Open Mobile Alliance (OMA) and standard control plane location solutions defined by 3GPP and 3GPP2. For example, server 140, 150 or 155 may function as (i) a SUPL SLP to support the SUPL location solution, (ii) an E-SMLC to support the 3GPP control plane location solution with LTE access on wireless communication link 123 or 125, or (iii) a Standalone Serving Mobile Location Center (SAS) to support the 3GPP Control Plane Location solution for UMTS.

Figure 2:
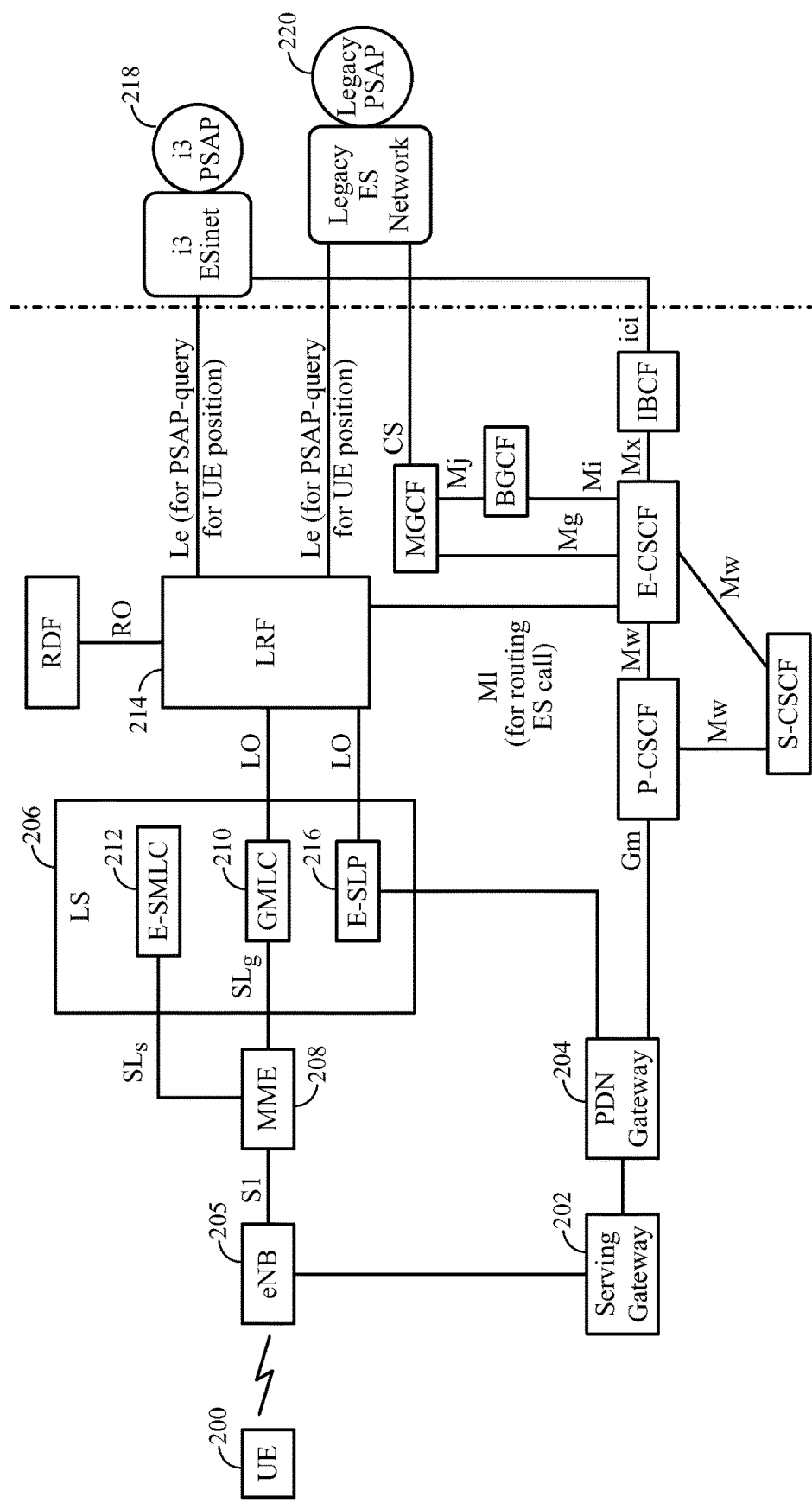
FIG. 2 is a schematic diagram of a network architecture capable of supporting emergency services according to an embodiment.

FIG. 2 is a schematic diagram of a network architecture to support emergency services calls and location of a UE 200 making an emergency services call on an LTE serving network according to an embodiment. Here, and as described in particular implementations below, location of UE 200 making an emergency services call may be supported with a user plane location solution such as the OMA SUPL solution using a serving gateway 202 and PDN gateway 204 to support TCP/IP transport of SUPL messages between UE 200 and an Emergency SUPL Location Platform (E-SLP) 216 functioning as a location server (LS) 206. Alternatively, obtaining an estimated location of UE 200 with an emergency services call may be supported using a control plane location solution using a mobility management entity (MME) 208 in communication with a gateway mobile location center (GMLC) 210 and an enhanced serving mobile location center (E-SMLC) 212 functioning as a location server (LS) 206. In this context, a user plane location solution may be facilitated with an exchange of messages in transactions occurring in entities typically accessible by UE 200 for services such as voice and data through eNB 205, serving gateway 202 and PDN gateway 204. A control plane solution, on the other hand, may be facilitated by an exchange of signaling messages over interfaces and using protocols that are supported for normal network operation as well as for location determination. Furthermore, one or more entities typically facilitating a user plane location solution (e.g., serving gateway 202 and/or PDN gateway 204) may be bypassed in a control plane location solution by use of other entities such as an MME 208 to communicate directly with location server (LS) 206.

In a particular implementation, a location retrieval function (LRF) 214 may initiate determination of a location of UE 200 in response to receiving an emergency event—for example after LRF 214 receives an emergency service call request in a Session Initiation Protocol (SIP) INVITE message sent from UE 200 to initiate the emergency call. As enabled by the architecture shown in FIG. 2 according to a particular implementation, LRF 214 may first attempt to initiate one or more positioning sessions using a user plane location solution to obtain a position fix for UE 200. Here, for example, LRF 214 may transmit a location request message to E-SLP 216 (e.g. an Emergency Location Immediate Request message defined according to the OMA MLP). E-SLP 216 may in turn attempt to initiate a SUPL positioning session with UE 200 and return any location estimate obtained for UE 200 to LRF 214. If E-SLP 216 is unable to return a location estimate for UE 200 to LRF 214 within some desired time limit and possibly after repeating a location request for UE 200 to E-SLP 216 one or more further times, LRF 214 may attempt to initiate one or more positioning sessions using a control plane location solution to obtain a requested position fix. Here, LRF 214 may transmit a location request message to GMLC 210 (e.g., an Emergency Location Immediate Request message defined according to MLP) to initiate a series of messages among GMLC 210, UE 200, MME 208, eNB 205 and E-SMLC 212 to obtain a position fix for UE 200 according to the control plane location solution defined by 3GPP for LTE in 3GPP TS 23.271 and TS 36.305.

As pointed out above, LRF 214 may initiate transactions to obtain an early-fix and a subsequent, higher accuracy final-fix. As described below in connection with particular implementations, LRF 214 may initiate such transactions in a user plane or a control plane.

Figure 3:
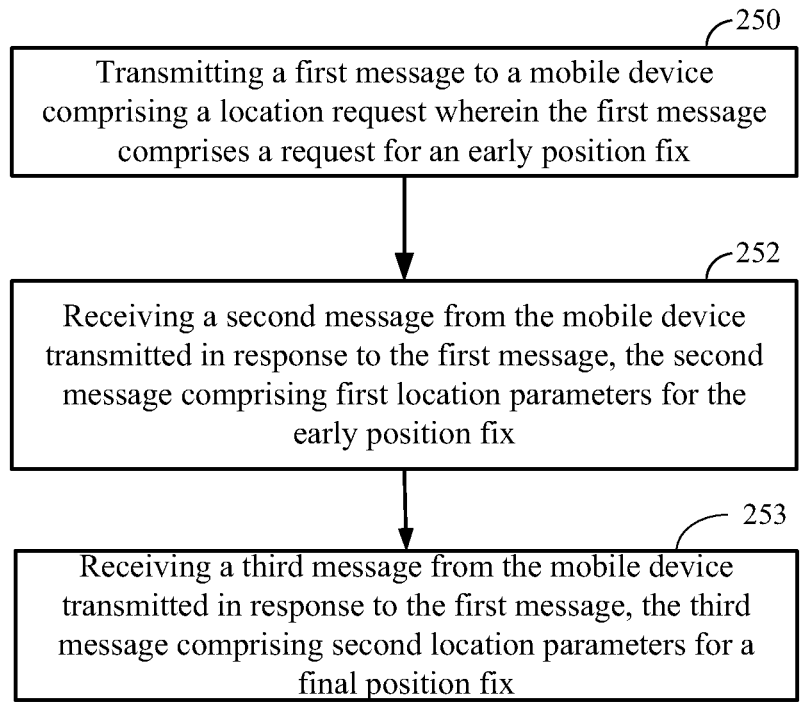
FIG. 3 is a flow diagram of a process for requesting and receiving an early position fix according to an embodiment.
Figure 4:
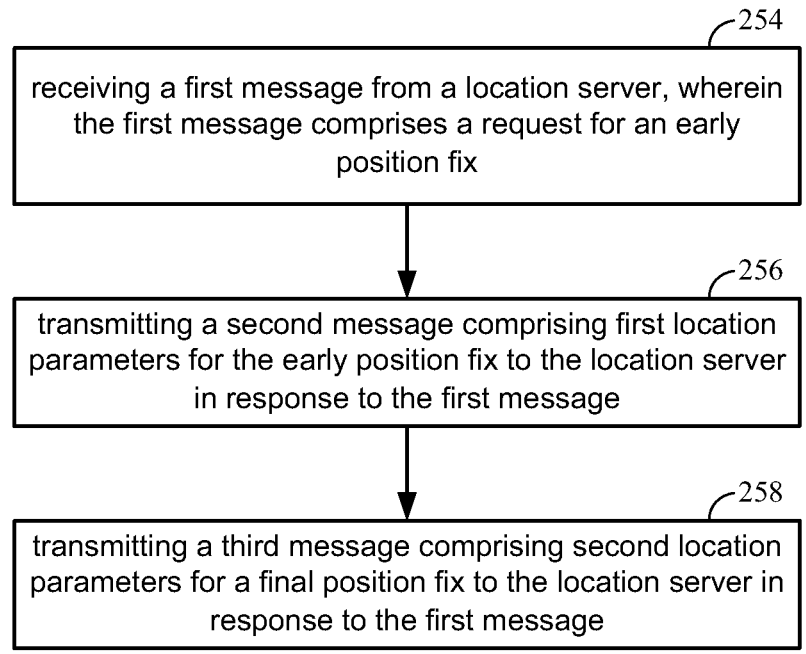
FIG. 4 is a flow diagram of a process for responding to request messages from a location server for an early position fix according to an embodiment.

FIG. 3 and FIG. 4 are flow diagrams illustrating interactions between a mobile device (e.g., UE 200) and an LS (e.g., LS 206) according to an embodiment. In one particular implementation, the LS may comprise an E-SLP (e.g. E-SLP 216). In another particular implementation, the LS may comprising an E-SMLC (e.g. E-SMLC 212). At block 250, an LS may transmit a first message to a mobile device comprising a request for an early position fix. The LS may be prompted to take such action in response to a request from another entity (e.g. an LRF such as LRF 214) for a location estimate for the mobile device in association with an emergency call. In one implementation, the message transmitted at block 250 may contain a response time for the early position fix. At block 254, an affected mobile device may receive the message transmitted at block 250 and then transmit a second message to the LS containing location parameters for the requested early position fix at block 256. For example, responsive to the message transmitted from the LS, the mobile device may obtain a current position fix or other parameters that may be indicative of at least a coarse location of the mobile device to be provided to the LS in the message transmitted at block 256. The LS may then receive the transmitted location parameters of an early position fix at block 252.

Subsequent, to transmitting location parameters for an early position fix at block 256, the mobile device may obtain location parameters for a final position fix by, for example, attempting any one of several positioning techniques discuss herein such as, for example, acquisition of GNSS signals, performing OTDOA based on acquisition of signals from terrestrial transmitters, just to provide a few examples. At block 258, the mobile device may transmit a message comprising the location parameters for the final position fix to the LS. Finally, at block 253, the LS may receive the message transmitted by the mobile device at block 258 containing the location parameters for the final position fix. In a particular implementation, location parameters for the early position fix or the final position fix transmitted at blocks 256 and 258 may comprise, for example, an estimated location of the mobile device, measurements indicative of the location of the mobile device, or a combination thereof. In another implementation, messages transmitted at blocks 256 and 258 may be transmitted in the same LPP transaction. In a further implementation, the early position fix sent at block 256 and the final position fix sent at block 258 may be obtained by the mobile device using one or more common positioning methods such as A-GNSS, OTDOA and/or E-CID.

Figure 5:
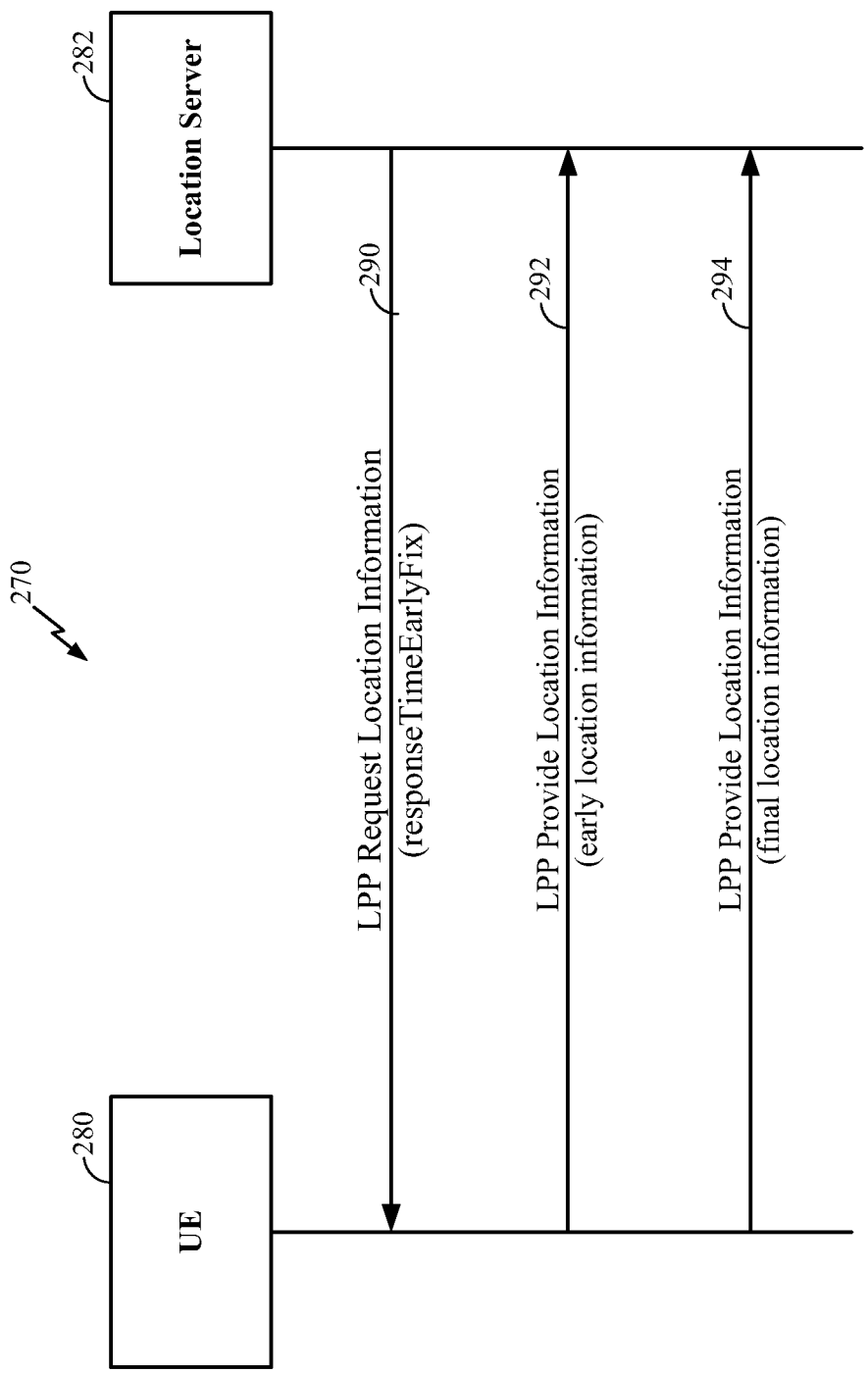
FIG. 5 is a message flow diagram of a procedure for obtaining an early position fix followed by a final position fix using LPP.

FIG. 5 shows an exemplary procedure 270 for obtaining an early position fix using LPP messages. Procedure 270 is supported by a UE 280 and a location server 282. UE 280 may correspond to mobile device 100 in FIG. 1 and location server 282 may correspond to any of servers 140, 150 and 155 in FIG. 1. The procedure 270 may be used in some embodiments in association with a control plane location solution such as the 3GPP control plane location solution for LTE. In these embodiments, location server 282 may correspond to E-SMLC 212 in FIG. 2 and UE 280 may correspond to UE 200 in FIG. 2. Procedure 270 may be used in other embodiments in association with a user plane location solution such as SUPL. In these embodiments, location server 282 may correspond to E-SLP 216 in FIG. 2 and UE 280 may correspond to UE 200 in FIG. 2.

Location server 282 may send a message 290 comprising an LPP Request Location Information message to UE 280 to request location parameters. This LPP Request Location Information message may indicate a type of location parameters or indications of location desired, and potentially an associated Quality of Service (QoS). QoS may indicate a desired accuracy of any location estimate for UE 280 and/or a desired response time. A type of location parameters desired may, for example, comprise location related measurements for one or more of the A-GNSS, OTDOA or E-CID position methods or may comprise a location estimate to be obtained by UE 280 using the A-GNSS position method. Location server 282 may also include a responseTimeEarlyFix IE inside a responseTime IE portion of a QoS IE to request early location parameters from UE 280. A value for responseTimeEarlyFix IE may specify a timer value (e.g., in the range 1 to 128 seconds) indicating a time by which UE 280 should return an early location fix to location server 282. Message 290 may also include a timer value in the responseTime IE indicating a time by which a final location fix should be returned. After receiving message 290, UE 280 attempts to obtain the location information requested in this message—e.g., attempts to obtain location related measurements for A-GNSS, OTDOA and/or E-CID or attempts to obtain a location estimate using A-GNSS.

Either before or as any timer value in a responseTimeEarlyFix IE that was received in message 290 expires, UE 280 may send message 292 containing an LPP Provide Location Information message to location server 282 to transfer early location parameters. Early location parameters may comprise either location related measurements for A-GNSS, OTDOA and/or E-CID or a location estimate obtained using A-GNSS, for example. Early location parameters may or may not conform to any location accuracy indicated in the QoS IE received at message 290. An endTransaction IE may be included in message 292 and set to a value of FALSE to indicate that an LPP transaction initiated at message 290 is not yet ended. If early location parameters are not available as any timer value in the responseTimeEarlyFix IE expires, UE 280 may skip sending message 292. After transmission of message 292, UE 280 may continue to obtain location parameters requested at message 290 (e.g., location related measurements for A-GNSS, OTDOA and/or E-CID or a location estimate obtained using A-GNSS). Continuation of location related measurements or location estimate derivation after message 292 may enable UE 280 to make use of location related measurements obtained prior to message 292, which may reduce delay and/or improve accuracy in obtaining final location parameters.

Either before or as any timer value in the responseTime IE that was received at message 290 expires, UE 280 may send an LPP Provide Location Information message to location server 282 at message 294 to transfer final location parameters. Final location parameters may comprise either location related measurements for A-GNSS, OTDOA and/or E-CID or a location estimate obtained using A-GNSS. Final location parameters may be more accurate than the early location parameters sent at message 292—e.g., may provide a more accurate location estimate for UE 280 or may enable location server 282 to determine a more accurate location estimate for UE 280. Final location parameters may conform to any particular location accuracy indicated in a QoS IE received at message 290 in particular embodiments An endTransaction IE may be included in message 294 and set to a value of TRUE to indicate that the LPP transaction started at message 290 is now ended.

In some embodiments of procedure 270, one or more of the LPP messages sent at messages 290, 292 and 294 may include an embedded LPP Extensions (LPPe) message defined according to the OMA LPPe positioning protocol. The embedded LPPe message may enable location server 282 to request and UE 280 to return measurements or a location estimate using (i) other positioning methods not supported by LPP such as methods in which measurements are obtained for signals from WiFi APs, Bluetooth APs, and sensors on UE 280 and/or (ii) extensions of position methods supported by LPP such as A-GNSS, OTDOA and/or E-CID. Thus, for example, when an embedded LPPe message is included at messages 290, 292 and/or 294, UE 280 may include location related measurements or a location estimate obtained at least in part from positioning methods or LPP positioning method extensions supported by LPPe in the early location parameters sent at message 292 and/or in the final location parameters sent at message 294.

It is pointed out that procedure 270 may be used as part of a control plane or user plane location solution, in which case LPP messages sent at messages 290, 292 and 294 in FIG. 5 may correspond to LPP messages sent in: messages 305, 306 and 308, respectively, described later for FIG. 6; messages 424a, 424b and 424c described later for FIG. 8; and messages 641, 638 and 637, respectively, described later for FIGS. 13A and 13B. Procedure 270 and the associated flow diagrams in FIG. 3 and FIG. 4 may be used to determine an early position fix and a final position fix for a mobile device in association with an emergency services call from the mobile device as described further on herein. However, procedure 270 and the associated flow diagrams in FIG. 3 and FIG. 4 may instead be used to determine an early position fix and a final position fix for a mobile device not in association with an emergency services call from the mobile device. For example, procedure 270 and the associated flow diagrams in FIG. 3 and FIG. 4 may be used to provide a location client that is not associated with supporting emergency services with an early position fix and a final position fix for a mobile device. This may assist the location client or the user of the location client in some situations. For example, if the location client corresponds to a device owned or carried by a first user and the mobile device being located is carried by a second user and the first user needs directions to find (e.g. meet up with) the second user, an early position fix may enable the first user to start moving towards the second user sooner than if only one final position fix was provided and/or may enable the first user to determine an approximate distance or time of travel to the second user more quickly than if only one final position fix was provided. Therefore, procedure 270 and associated flow diagrams in FIGS. 3 and 4 may be used to support location services generally including but not restricted to location services associated with an emergency call.

Figure 6:
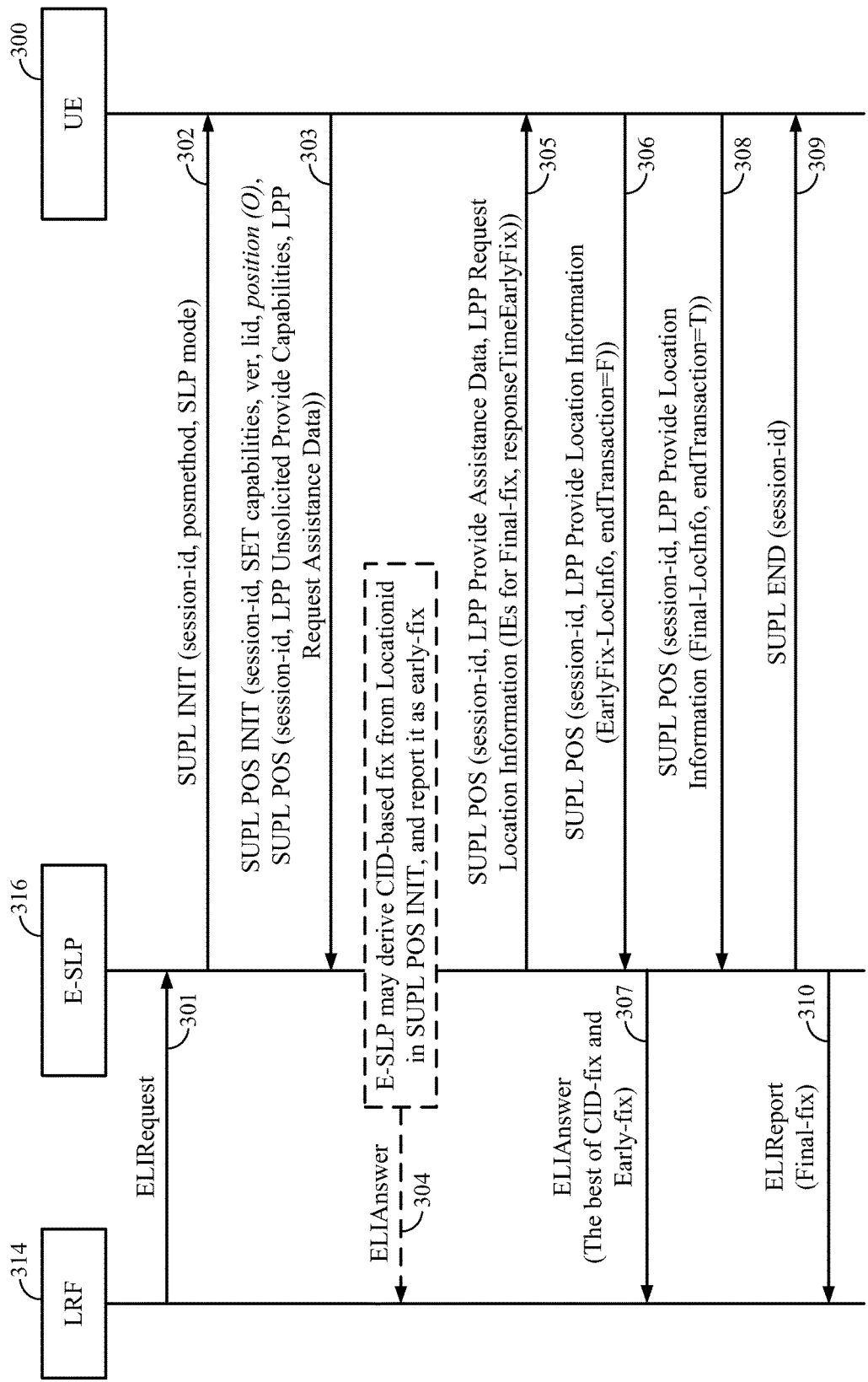
FIG. 6 is a message flow diagram of a transaction in a user plane according to an embodiment.

FIG. 6 is a call flow diagram illustrating an approach to support positioning operations with an initial early position fix followed by a later more accurate final position fix for the SUPL user plane location solution according to an embodiment. In FIG. 6, UE 300 may correspond to UE 200 in FIG. 2, LRF 314 may correspond to LRF 214 in FIG. 2 and E-SLP 316 may correspond E-SLP 216 in FIG. 2. In response to a request message 301 (e.g., an MLP Emergency Immediate Location Request) from an LRF 314 in the LTE network serving a UE 300 (e.g., acting as a SET) that has made an emergency call, an E-SLP 316 may send a SUPL INIT message 302 to UE 300 to instigate a SUPL session with UE 300, enabling E-SLP 316 to obtain a location estimate for UE 300. In response, UE 300 may establish a secure IP connection to E-SLP 316 (not shown in FIG. 6), and may then send a SUPL POS INIT message 303 to E-SLP 316 including a lid parameter (e.g., Location ID parameter) and optionally a rough position estimate if known. In some embodiments, a cell ID based position fix (e.g., based on the received lid parameter) may be provided by E-SLP 316 to LRF 314 in message 304 as an early position fix. In other embodiments, as described later herein, E-SLP 316 may instead provide an initial, early position fix to LRF 314 at message 307 followed by a final position fix (possibly a more accurate position fix) at message 310. According to particular embodiments, E-SLP 316 may be capable of requesting position fixes obtained by A-GNSS, E-CID and/or OTDOA, and/or specifying a response time (e.g., responseTimeEarlyFix) for either an early or final position fix using encapsulated commands at message 305.

According to an embodiment, an LPP Request Location Information message encapsulated in SUPL POS message 305 may be sent by E-SLP 316 to UE 300 to request both an early position fix and a final position fix. To indicate that an early position fix is requested and to specify a desired response time for the early position fix, E-SLP 316 may include a Response Time IE in the LPP Request Location Information message included in message 305 that includes a desired response time for the final position fix and a preferred or required response time for the early position fix. A response time specified for the early position fix may be contained in a responseTimeEarlyFix IE that allows response times in the range 1.0 to 128.0 seconds, for example. The responseTimeEarlyFix IE may be optional in the LPP Response Time IE and if present may indicate to UE 200 that an early position fix is to be obtained by UE 200 and sent to E-SLP 316 before the response time indicated in the responseTimeEarlyFix IE has expired. Message 306 in FIG. 6 (described later) may not occur if UE 200 chooses to ignore the responseTimeEarlyFix IE, does not support (e.g., does not recognize) the responseTimeEarlyFix IE or cannot obtain measurements or a location estimate before expiration of the response time in the responseTimeEarlyFix IE. In this case, E-SLP 316 may timeout on a response in message 306, and may transmit message 307 (described later) using any position fix obtained from the lid parameter received in the SUPL POS INIT message 303.

After receiving message 305 in FIG. 6, UE 300 may proceed with obtaining and reporting an early position fix. The early position fix may comprise location related measurements (e.g., for A-GNSS, OTDOA or E-CID) if measurements rather than a location estimate were requested in the LPP Request Location Information message received in message 305 or may comprise a location estimate (e.g. obtained by UE 300 from A-GNSS measurements) if a location estimate rather than measurements was requested in message 305. For example, if the LPP Request Location Information in message 305 requests A-GNSS and OTDOA positioning measurements, UE 300 may return A-GNSS-only, OTDOA-only, or A-GNSS and OTDOA measurements as an early position fix in an LPP Provide Location Information message encapsulated in a SUPL POS message 306.

Similarly, if the LPP Request Location Information in message 305 requests a location estimate based on A-GNSS positioning measurements, UE 300 may return a location estimate based on GNSS measurements as an early position fix in an LPP Provide Location Information message encapsulated in SUPL POS message 306.

After sending the early location fix in message 306 in FIG. 6, UE 300 may proceed with obtaining and reporting a final position fix. The final position fix may comprise location parameters of the same type as returned for the early location fix in message 306—e.g. location related measurements for A-GNSS, OTDOA and/or E-CID if measurements rather than a location estimate were requested in message 305 or a location estimate if a location estimate rather than measurements was requested in message 305. The final position fix in message 308 may be more accurate than the early position fix in message 306. A final position fix may be included in an LPP Provide Location information message that is encapsulated in SUPL POS message 308. After receiving the SUPL POS message 308, E-SLP 316 may terminate the SUPL session by sending a SUPL END message 309 to UE 300.

E-SLP 316 may generate an early position fix after receiving the SUPL POS INIT message 303 and the SUPL POS message 306, and may return the early position fix to LRF 314 in message 307 (e.g., which may be in an MLP Emergency Immediate Location Answer message). E-SLP 316 may further generate a final position fix after receiving the SUPL POS message 308, and may return the final position fix to LRF 314 in message 310 (e.g. which may be an MLP Emergency Immediate Location Report message). In some embodiments, E-SLP 316 may request more location measurements or location estimates by repeating message 305 (e.g. to request different measurements and/or different position methods) prior to returning an early position fix in message 307 and/or prior to returning the final position fix in message 310. Repetitions of message 305 may or may not include a request for an early position fix.

In a particular implementation, the LPP messages contained in the SUPL POS messages 305, 306 and 308 in FIG. 6 may be part of the same LPP transaction. The LPP message included in message 305 may request both an early position fix and a more accurate final position fix from UE 300. A request for the early position fix may be conveyed by the responseTimeEarlyFix parameter in the LPP Request Location Information encapsulated in message 305. In a particular implementation, UE 300 may support the LPP responseTimeEarlyFix parameter and may obtain and then return an early position fix in the LPP Provide Location information message encapsulated in message 306, and may indicate in the LPP Provide Location Information message that the LPP transaction initiated in message 305 is not yet ended. Later, after UE 300 obtains a final position fix, the final position fix may be returned to E-SLP 316 in a second LPP Provide Locating Information message encapsulated in message 308 that may indicate that the LPP transaction started in message 305 is now completed. By combining requests for both the early position fix and the later more accurate final position fix in the same request in message 305 (e.g., by specifying IEs Final-fix and responseTimeEarlyFix), UE 300 may combine the derivation of both position fixes such that the same positioning methods may be used by UE 300 for both position fixes. Accordingly, information (e.g., measurements) used to obtain the early position fix may also be used to obtain a subsequent final position fix. This may reduce delay and/or improve accuracy for the final position fix. In some embodiments, instead of returning a position fix in messages 306 and 308, UE 300 may return measurements in message 306 and/or message 308 that E-SLP 316 may use to determine an early position fix (after receiving measurements for message 306) and/or a more accurate fix (after receiving measurements for message 308). A SUPL session initiated at SUPL POS INIT message 303 may end after message 308 with E-SLP 316 sending the SUPL END message 309 to UE 300.

Figure 7:
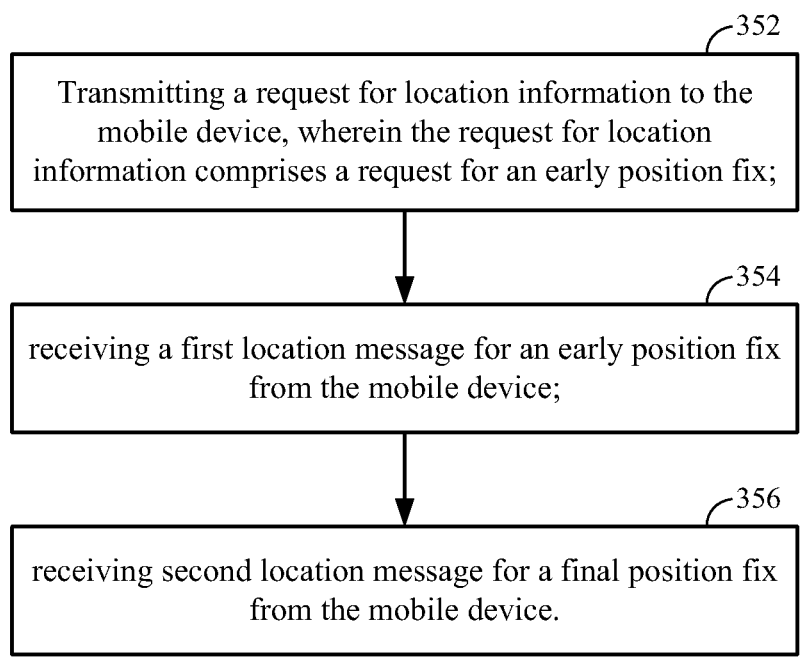
FIG. 7 is a flow diagram of a process for obtaining an early position fix followed by a final position fix according to an embodiment.

FIG. 7 is a flow diagram of a process for obtaining early and final position fixes from a mobile device using a user plane location solution such as SUPL according to an embodiment. The process of FIG. 7 may be implemented according to the message flow of FIG. 6. For example, at block 352, E-SLP 316 may transmit a request for location information to UE 300 in message 305. In response to message 305, E-SLP 316 may receive an early position fix from UE 300 in message 306 at block 354, and receive a final position fix in message 308 at block 356.

Figure 8:
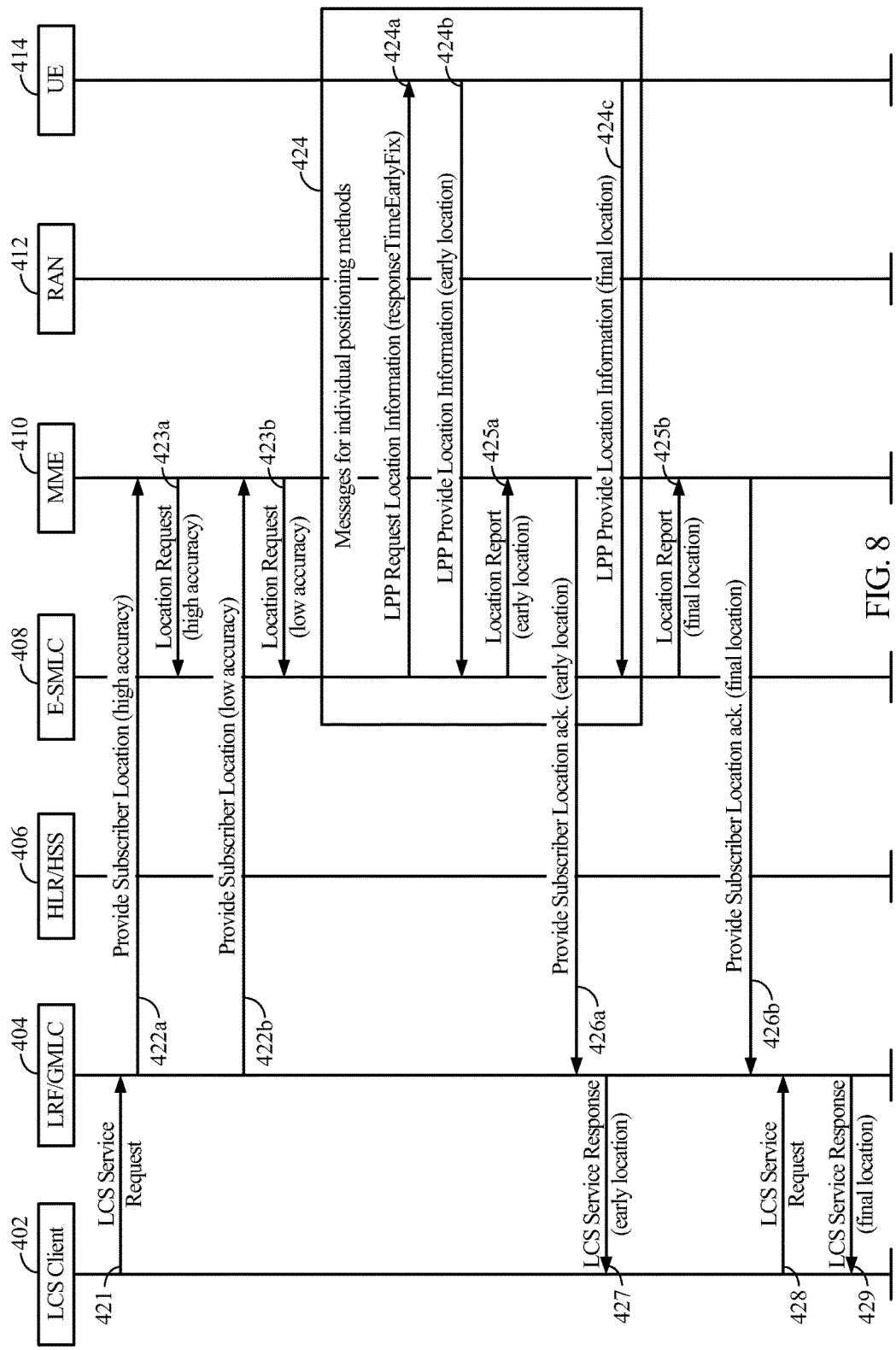
FIG. 8 is a message flow diagram in a control plane performed in response to an emergency event to provide an early position fix followed by a final position fix according to an embodiment.

FIG. 8 is a message flow diagram illustrating an approach to supporting positioning operations with an initial early location fix followed by a later more accurate position fix for the 3GPP LTE control plane location solution according to an embodiment. In FIG. 8, UE 414 may correspond to UE 200 in FIG. 2, RAN 412 may correspond to eNB 205 in FIG. 2, MME 410 may correspond to MME 208 in FIG. 2, E-SMLC 408 may correspond to E-SMLC 212 in FIG. 2, LRF/GMLC 404 may comprise an LRF that may correspond to LRF 214 in FIG. 2 and a physically or logically separate GMLC that may correspond to GMLC 210 in FIG. 2 and LCS Client 402 may correspond to the i3 PSAP 218 or legacy PSAP 220 in FIG. 2.

At 421 in FIG. 8, LCS client 402 (e.g. a PSAP) requests the location of a target UE 414, and may identify the target UE 414 and the serving LRF belonging to LRF/GMLC 404 using correlation indications previously supplied to the LCS Client 402 as an emergency call was established by UE 414 to the LCS Client 402 (not shown in FIG. 8). At 422a, the LRF/GMLC 404 may determine serving MME 410 for UE 414 by associating the correlation indications received from the LCS client 402 at 421 with other information received previously from the MME 410 (not shown in FIG. 8). LRF/GMLC 404 may then send a Provide Subscriber Location message at 422a to the serving MME 410 to request a location estimate for UE 414. Message 422a may carry an identification for UE 414 such as the Mobile Station International Subscriber Directory Number (MSISDN), the International Mobile Subscriber Identity (IMSI) and/or the International Mobile Station Equipment Identity (IMEI) for the target UE 414, as well as a specified QoS and an indication of a location request from an emergency services client. MME 410 may identify the target UE 414 using the IMSI, MSISDN and/or the IMEI received at 422a. The specified QoS may indicate high location accuracy.

In response to a request provided in message 422a, MME 410 may send a Location Request for UE 414 to the E-SMLC 408 at message 423a and specify a QoS (e.g. for high location accuracy) received from message 422a, an identification for UE 414 (e.g., the IMSI and/or IMEI) and an indication of an emergency services client. If LRF/GMLC 404 requires an early location fix for UE 414, LRF/GMLC 404 may send a second Provide Subscriber Location message to MME 410 in message 422b to request a second location estimate for UE 414. The request sent in message 422b may contain the same information as in message 422a but with a QoS indicating low (or lower) location accuracy. Based on receipt of the second location request at message 422b, MME 410 may send a second Location Request for UE 414 to E-SMLC 408 at message 423b and may include the QoS (e.g. for low location accuracy) received at message 422b, an identification for UE 414 (e.g. an IMSI and/or IMEI) and an indication of an emergency services client. E-SMLC 408 may determine that the first location request received at message 423a and the second location request received at message 423b are for the same UE 414 due to inclusion of the same UE identity (e.g. the same IMSI or the same IMEI) in both location requests. E-SMLC 408 may also determine that the first and second location requests at messages 423a and 423b are for emergency services based on inclusion of an emergency services client indication in both requests.

At step 424 associated with messages 424a, 424b and 424c (described later), E-SMLC 408 may perform positioning for the two location requests received at messages 423a and 423b. The positioning may include obtaining an early position fix from UE 414 to satisfy the second request at message 423b for low location accuracy and a later final position fix from UE 414 to satisfy the first request at message 423a for high location accuracy. To obtain both early and final position fixes, LPP procedure 270 described earlier in association with FIG. 5 may be used by E-SMLC 408 as described next. E-SMLC 408 may be configured to invoke the LPP procedure 270 after receiving the first location request at message 423a with high location accuracy for an emergency services client type even though the second location request at message 423b may not yet have been received.

E-SMLC 408 begins the positioning at step 424 by sending an LPP Request Location Information message to UE 414 at message 424a with a request for an early position fix. Message 424a may correspond to the LPP Request Location Information message sent at message 290 in procedure 270, and may be sent either before or after receiving the second location request at message 423b. In response to receiving message 424a, UE 414 may obtain an early position fix and then a final position fix as described for procedure 270 in FIG. 5. UE 414 may then send the early position fix to E-SMLC 408 in an LPP Provide Location Information message at message 424b and then at a later time send the final position fix to E-SMLC 408 in another LPP Provide Location Information message at message 424c. Messages 424b and 424c may correspond to the messages 292 and 294, respectively, in procedure 270.

In response to receiving an early position fix at message 424b, E-SMLC 408 may return the early position fix to MME 410 at message 425a in response to the second location request received earlier at message 423b. If the second location request at message 423b is not received by E-SMLC 408 prior to receiving the early location fix from UE 414 at message 424b (e.g. which may occur if message 422b is delayed or is not sent), E-SMLC 408 may store the early position fix and either (i) return the early fix later after receiving the second location request at message 423b if this occurs before receiving the final position fix at message 424c or (ii) discard the early position fix if the second location request at message 423b is received after receiving the final position fix at message 424c or is not received. In an embodiment, if the early position fix at message 424b is not received by E-SMLC 408 at or shortly after the expiration of an early position fix timer included by E-SMLC 408 in the message sent to UE 414 at message 424a (e.g. UE 414 is unable to obtain early location measurements or an early location estimate), E-SMLC 408 may return an early position fix determined from the serving cell for UE 414 which may have been provided by MME 410 to E-SMLC 408 in the first location request sent at message 423a and/or in the second location request sent at message 423b. In this embodiment, any early location fix received from UE 414 later at message 424b may be discarded by E-SMLC 408.

In response to receiving an early position fix from E-SMLC 408 at message 425a, MME 410 returns the early position fix to LRF/GMLC 404 at message 426a in response to the location request received at message 422b. In response to receiving the early position fix at message 426a, the LRF in LRF/GMLC 404 may send the early position fix to LCS client 402 at message 427 in response to the request received at 421.

After E-SMLC 408 receives a final position fix from UE 414 at message 424c, E-SMLC 408 may return the final position fix to MME 410 at message 425b in response to the first location request received at message 423a. MME 410 may then return the final position fix to LRF/GMLC 404 at message 426b in response to the location request received at message 422a. LRF/GMLC 404 may store the final position fix. Since the early position fix received at message 427 may not be accurate, LCS Client 402 may send a request for a more accurate location to LRF/GMLC 404 at message 428. LRF/GMLC 404 then sends the final location fix to the LCS client 402 at message 429. If LRF/GMLC 404 had not yet received the final location fix at message 426b, LRF/GMLC 404 may await receipt of the final location fix at message 426b before responding to LCS Client 402 at message 429.

Note that in some embodiments, the QoS in the first location request sent for UE 414 at messages 422a and 423a may indicate low location accuracy instead of high location accuracy and the QoS in the second location request at messages 422b and 423b may indicate high location accuracy. In these embodiments, other messages in FIG. 8 may be sent as described earlier except that the early position fix returned at messages 425a and 426a may be in response to the requests at messages 423a and 422a, respectively, and the final position fix returned at messages 425b and 426b may be in response to the requests at messages 423b and 422b, respectively. The message flow shown in FIG. 8 may have an advantage in reusing existing signaling messages and existing parameters defined for the 3GPP control plane location solution for LTE and may not require any new messages or parameters to be defined and implemented except for a new LPP parameter to support an early location fix that may be included in the LPP message sent at message 424a.

Figure 9:
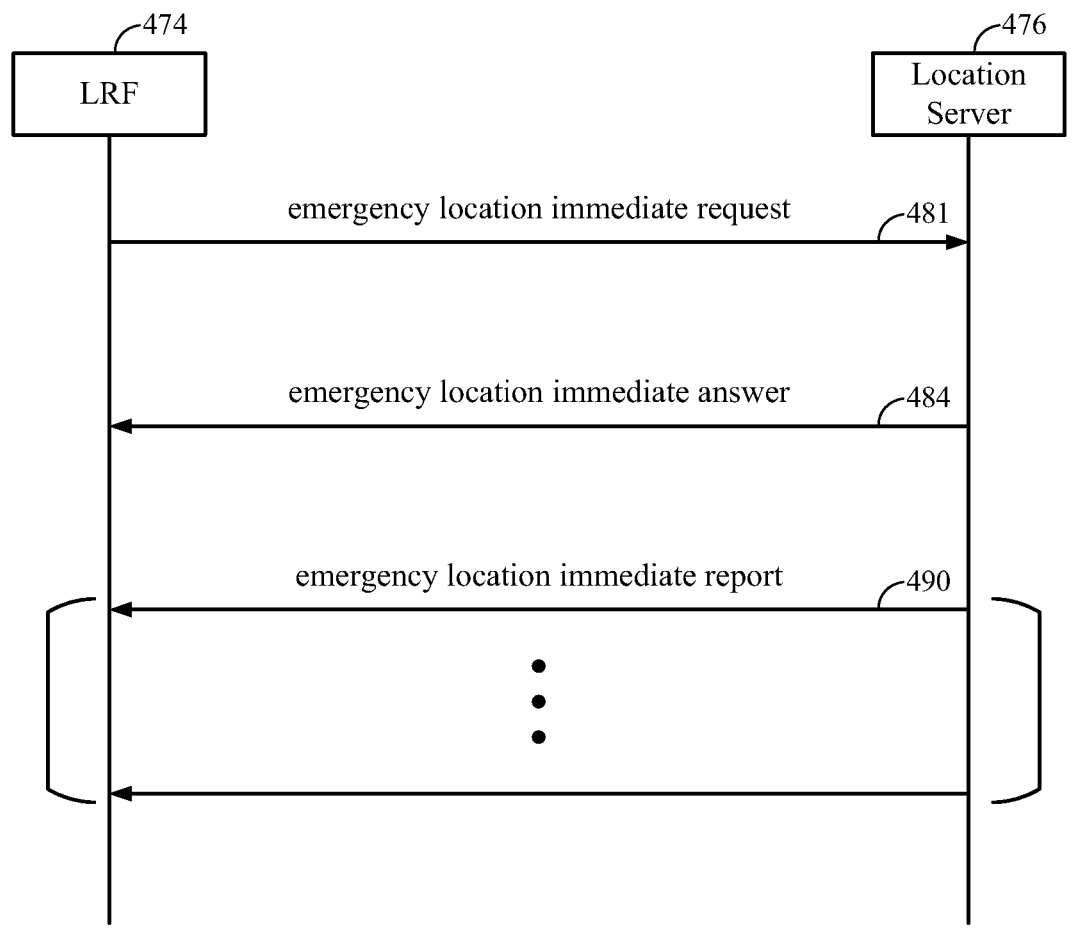
FIG. 9 is a message flow diagram of a transaction to provide a series of location reports in response to a request according to an embodiment.

FIG. 9 is a call flow diagram for a process according to a particular implementation of the call flows discussed above with reference to FIGS. 6 and 8. In the case of FIG. 6, an OMA MLP protocol may allow location server 476, which may correspond to E-SLP 316 in FIG. 6 and E-SLP 216 in FIG. 2, to return an early position fix to LRF 474, which may correspond to LRF 314 in FIG. 6 and LRF 214 in FIG. 2. In the case of FIG. 8, the OMA MLP protocol may allow location server 476, which may correspond to the GMLC portion of LRF/GMLC 404 in FIG. 8 and to GMLC 210 in FIG. 2, to return an early position fix to LRF 474, which may correspond to the LRF portion of LRF/GMLC 404 in FIG. 8 and to LRF 214 in FIG. 2. The process in FIG. 9 may be enhanced to support an overall end-to-end message flow. FIG. 9 shows only the interactions between location server 476 and LRF 474 to enable LRF 474 to request a position fix from location server 476 for a UE (not shown in FIG. 9) that has instigated an emergency call. The request is sent by LRF 474 at message 481 and location server 476 then obtains an early position fix and then a final position fix (not shown in FIG. 8) for the UE and returns these to LRF 474 at messages 484 and 490, respectively. In some embodiments, location server 476 uses SUPL to obtain the early and final location fixes according to the call flow described for FIG. 6 with messages 481, 484 and 490 in FIG. 9 then corresponding, respectively, to messages 301, 307 and 310 in FIG. 6. In some embodiments, the call flow shown in FIG. 9 may be used in association with a control plane location solution according to the call flow described for FIG. 8. In these control plane embodiments, messages 481, 484 and 490 in FIG. 9 may correspond to messages sent between the LRF and GMLC portions of LRF/GMLC 404 that are not shown in FIG. 8 but may correspond to messages that are sent following message 421 and before message 422a in the case of message 481, after message 426a and before message 427 in the case of message 484 and after message 426b and before message 429 in the case of message 490.

According to an embodiment, as described above in connection with FIG. 9, an LRF may make one or more attempts to obtain early and final position fixes for a UE using a user plane location solution (e.g., as illustrated in FIG. 6) before attempting to obtain early and final position fixes using a control plane location solution (e.g., as illustrated in FIG. 8). For example, an LRF or an E-SLP may make two initial positioning attempts to obtain a location of a UE via SUPL. In case both attempts fail, a third attempt may be made by the LRF via a control plane location solution (e.g. with the LRF requesting the UE location from a GMLC). Alternatively, the third attempt may be made by the E-SLP without involving the LRF by invoking a GMLC function collocated with the E-SLP (or accessible from the E-SLP) to obtain the UE location using a control plane location solution. In some embodiments, the control plane location attempt may not request an early-fix.

Figure 10:
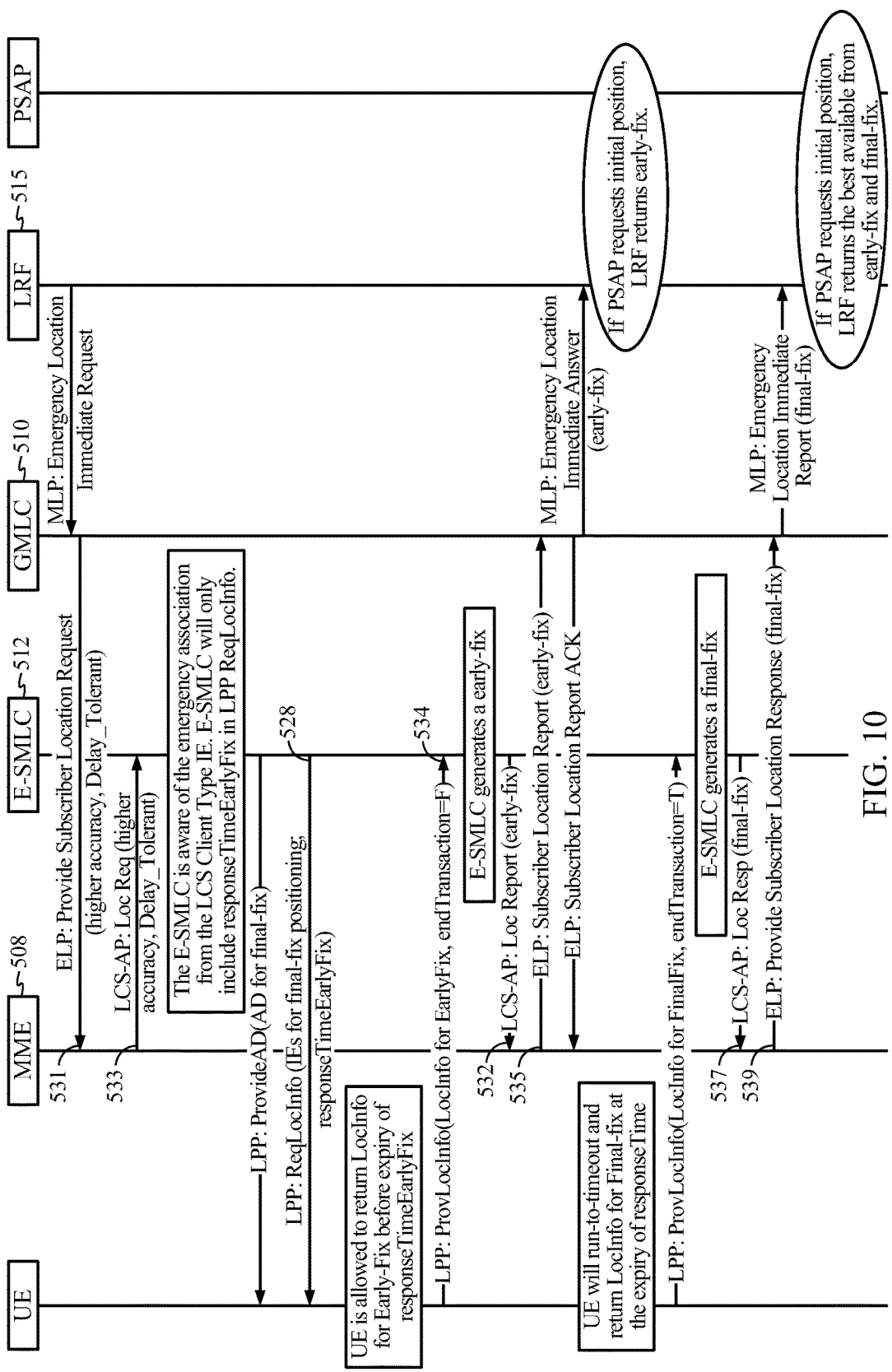
FIG. 10 is a message flow diagram of transactions performed in a control plane in response to an emergency event according to an embodiment.

As discussed above, particular implementations are directed to responding to an emergency event by generating an initial early position fix followed by a more accurate and delayed final position fix. FIG. 10 is a diagram illustrating a procedure to support an early position fix using a control plane location solution for LTE. The procedure in FIG. 10 is similar to the procedure described earlier for FIG. 8 and may make use of the same LPP procedure 270 to obtain an early and a final position fix from a UE. However, there are differences between the procedure in FIG. 10 and the procedure in FIG. 8; for example, the procedure in FIG. 10 may only require one location request to be sent from a GMLC to an MME and one location request to be sent from the MME to an E-SMLC. In FIG. 10, two separate location responses may still be returned from the E-SMLC to the MME and from the MME to the GMLC containing an early position fix in the first response and a final position fix in the second response. However, the messages used to return the early position fix from the E-SMLC to the MME and from the MME to the GMLC may differ from the messages used in the procedure in FIG. 8. Because only one location request may be sent by the GMLC to the MME and from the MME to the E-SMLC, the procedure in FIG. 10 may be more efficient than the procedure in FIG. 8. The procedure in FIG. 10 may be implemented according to modifications of and/or extensions to LPP as set forth in Evolved Universal Terrestrial Radio Access (E-UTRA); LTE Positioning Protocol (LPP) (3GPP TS 36.355), and modifications of and/or extensions to LCS-AP as set forth in LCS Application Protocol (LCS-AP) Between the Mobile Management Entity (MME) and Evolved Serving Mobile Location Center (E-SMLC); SLs Interface (3GPP TS 29.171) to better support a response to an emergency event. In a particular implementation, a format for LPPReqLocInfo message 528 may be altered or extended to accommodate an optional parameter responseTimeEarlyFix to specify a response time for obtaining the early position fix. In addition, LCS-AP Loc Report message 532 may be defined to allow reporting an early-fix from E-SMLC 512 to MME 508.

Figure 11:
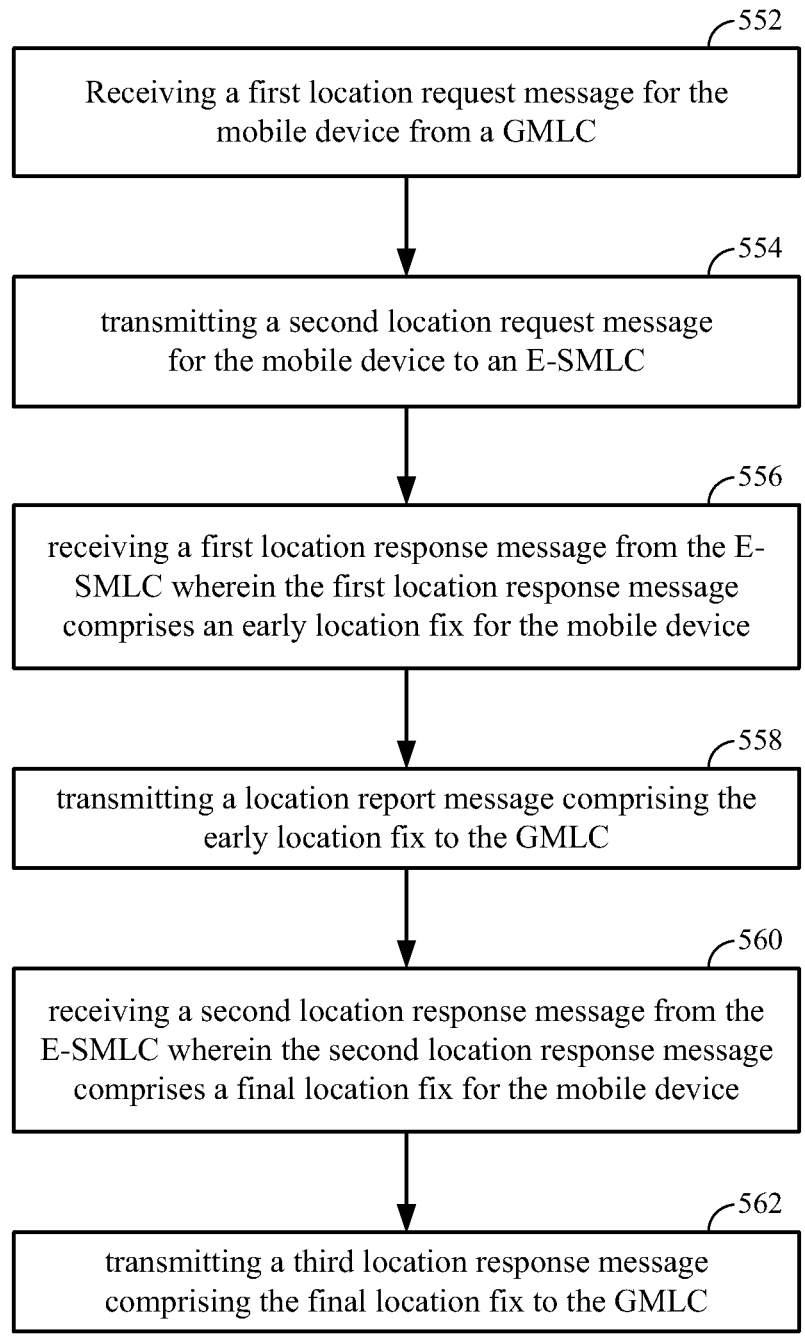
FIG. 11 is a flow diagram of a process for providing an early location fix and a final location fix in response to a request message according to an embodiment.
Figure 12:
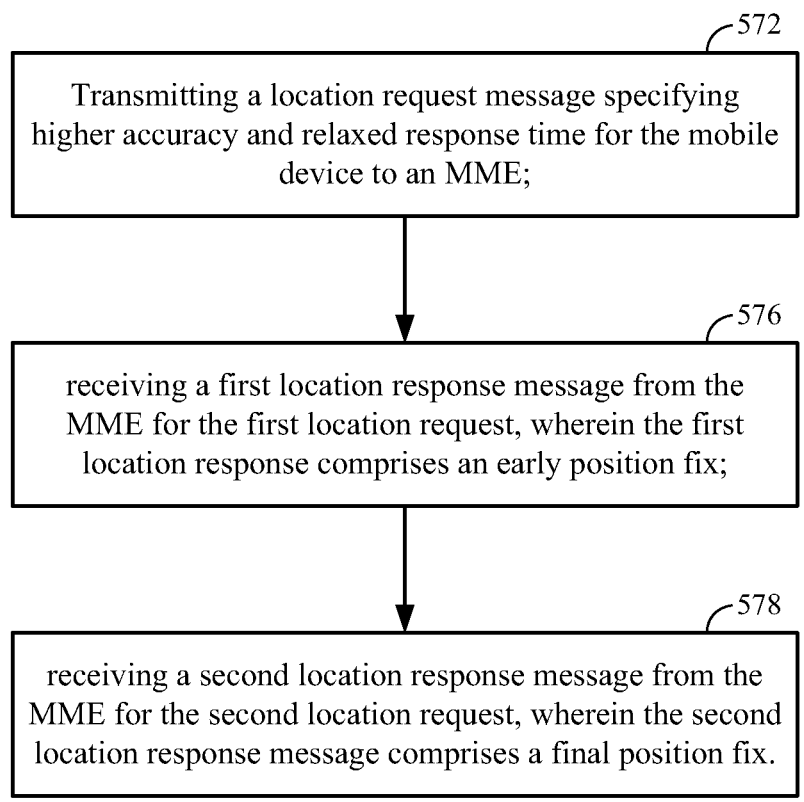
FIG. 12 is a flow diagram of a process for obtaining an early and a final fix in response to a request message according to an embodiment.

As illustrated in FIG. 11 and FIG. 12, according to aspects of a particular implementation of the message flow of FIG. 10, at block 552 MME 508 may receive a first location request message from GMLC 510 such as an Evolved Packet Core (EPC) LCS Protocol (ELP) Provide Subscriber Location request message 531. As indicated at block 572 which may be applicable to GMLC 510, the first location request message may specify a higher accuracy and relaxed response time. At block 554, MME 508 may transmit a second location request message to E-SMLC 512 as an LCS-AP Loc Req message 533. At block 556, MME 508 may receive an interim location response message comprising an early location fix from E-SMLC 512 in an LCS-AP Loc Report message 532 which may be referred to as an LCS-AP Location Report message. At block 558, MME 508 may transmit a location report comprising the early location fix to GMLC 510 in an ELP Subscriber Location Report message 535 (e.g., received by GMLC 510 at block 576). At block 560, MME 508 may receive a final location response message comprising a final location fix from E-SMLC 512 in an LCS-AP Loc Resp message 537. In a particular implementation, LCS-AP Loc Report message 532 may transmit a location report to MME 508 comprising the early position fix. E-SMLC 512 may return a final position fix to MME 508 in an LCS-AP Loc Response message 537. Accordingly, GMLC 510 need not send an additional ELP Provide Subscriber Location request message to MME 508 following transmission of an initial ELP Provide Subscriber Location request message 531. Finally, at block 562, MME 508 may return a location response comprising a final position fix to GMLC 510 as an ELP Provide Subscriber Location Response message 539 (which may be received by GMLC 510 at block 578). In some embodiments, LCS-AP Loc Req message 533 sent at block 554, LCS-AP Loc Report message 532 received at block 556 and LCS-AP Loc Resp message 537 received at block 560 may be part of the same LCS-AP procedure.

Figure 13A:
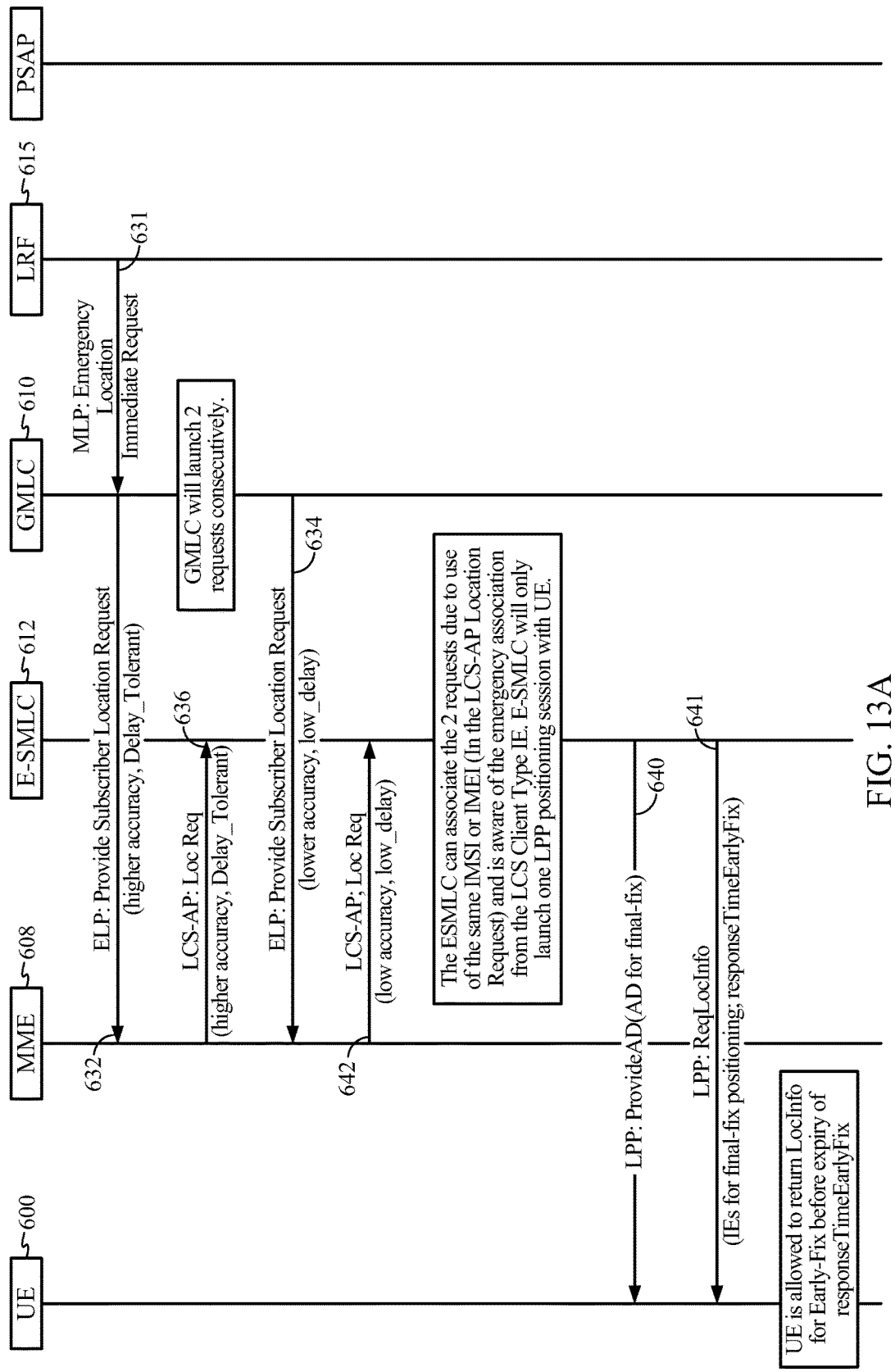
FIG. 13A and FIG. 13B are consecutive message flow diagrams of procedures in a control plane performed in response to an emergency event to provide an early position fix followed by a final position fix according to an embodiment.
Figure 13B:
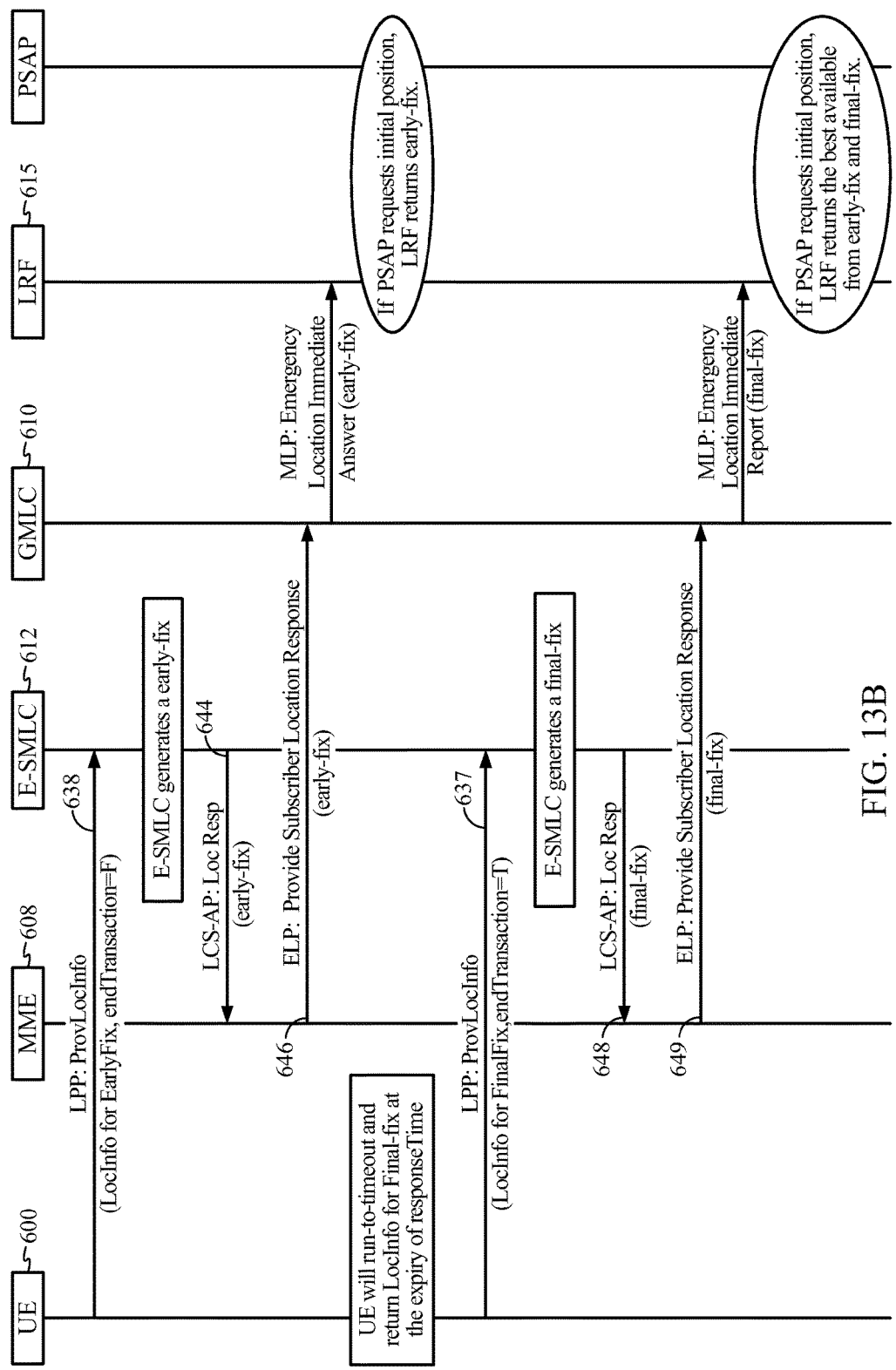

In an alternative implementation, FIG. 13A and FIG. 13B exemplify a procedure and associated call flow that may be implemented using a control plane location solution according to LPP extensions and/or modifications. The procedure shown in FIG. 13A and FIG. 13B may be similar to or the same as the procedure described earlier in association with FIG. 8. However, whereas the description of FIG. 8 embodies the overall end to end message flow, the description below for FIG. 13A and FIG. 13B embodies particular impacts to different entities to support the procedure. Therefore, FIG. 8 and FIG. 13A and FIG. 13B may be complementary. As pointed out in the implementation of the message flow for FIG. 10, GMLC 510 may receive an early position fix in an ELP Subscriber Location Report message 535 and a final position fix in an ELP Provide Subscriber Location Response message 539 in response to a single location request message in an ELP Provide Subscriber Location Request message 531. In the particular implementation of FIG. 13A and FIG. 13B, on the other hand, GMLC 610 may be configured to launch two ELP Provide Subscriber Location Requests (PSLRs) 632 and 634 in response to receipt of a location request from LRF 615 (e.g., received in an MLP Emergency Location Immediate Request message 631). An MME 608 may be configured or modified to support two ongoing location requests for UE 600 and to include an IMSI or IMEI for UE 600 in an LCS-AP Location Request 636 and an LCS-AP Location Request 642. An E-SMLC 612 may be configured to request an early position fix for UE 600 after receiving a high accuracy location request for UE 600 indicating an emergency services client. E-SMLC 612 may start LPP signaling (e.g., send LPP Provide AD message 640) with UE 600 before receiving LCS-AP Loc Req message 642 indicating a low accuracy. E-SMLC 612 may further associate the low accuracy location request (LCS-AP Location Request) 642 with the high accuracy location request (LCS-AP Location Request) 636 by inclusion of the same IMSI or same IMEI in each request, even though each request may contain a different session or transaction ID assigned by MME 608. This may enable E-SMLC 612 to provide an early position fix in the response 644 to the low accuracy request message (LCS-AP Location Request) 642 and a final position fix for the same UE 600 in the response 648 to the high accuracy request message (LCS-AP Location Request) 636. Although E-SMLC 612 may generate an early position fix after receiving a first LPP ProvLocInfo message 638, there may be some cases (e.g., only cell ID is provided by UE 600) where E-SMLC 612 requests more location parameters (and maybe provides positioning assistance parameters) using additional LPP messages (not shown). For a legacy UE or where a UE is unable to return an early position fix, for example, E-SMLC 612 may establish a timeout condition for receipt of an LPP ProvLocInfo message 638 based on the responseTimeEarlyFix; and may return a position fix based on the known cell ID for UE 600 as the timeout expires, thereby making early position fix support transparent to GMLC 610. As shown, early and final position fixes may be requested and reported via the MME 608 and GMLC 610 in separate messages, however a single LPP session may be managed between E-SMLC 612 and UE 600. The embodiment of FIG. 13A and FIG. 13B may be implemented with a modification of or extensions to the LPP protocol to accommodate an optional responseTimeEarlyFix IE in LPP ReqLocInfo message 641 for specifying a response time to obtain an early position fix.

Figure 14:
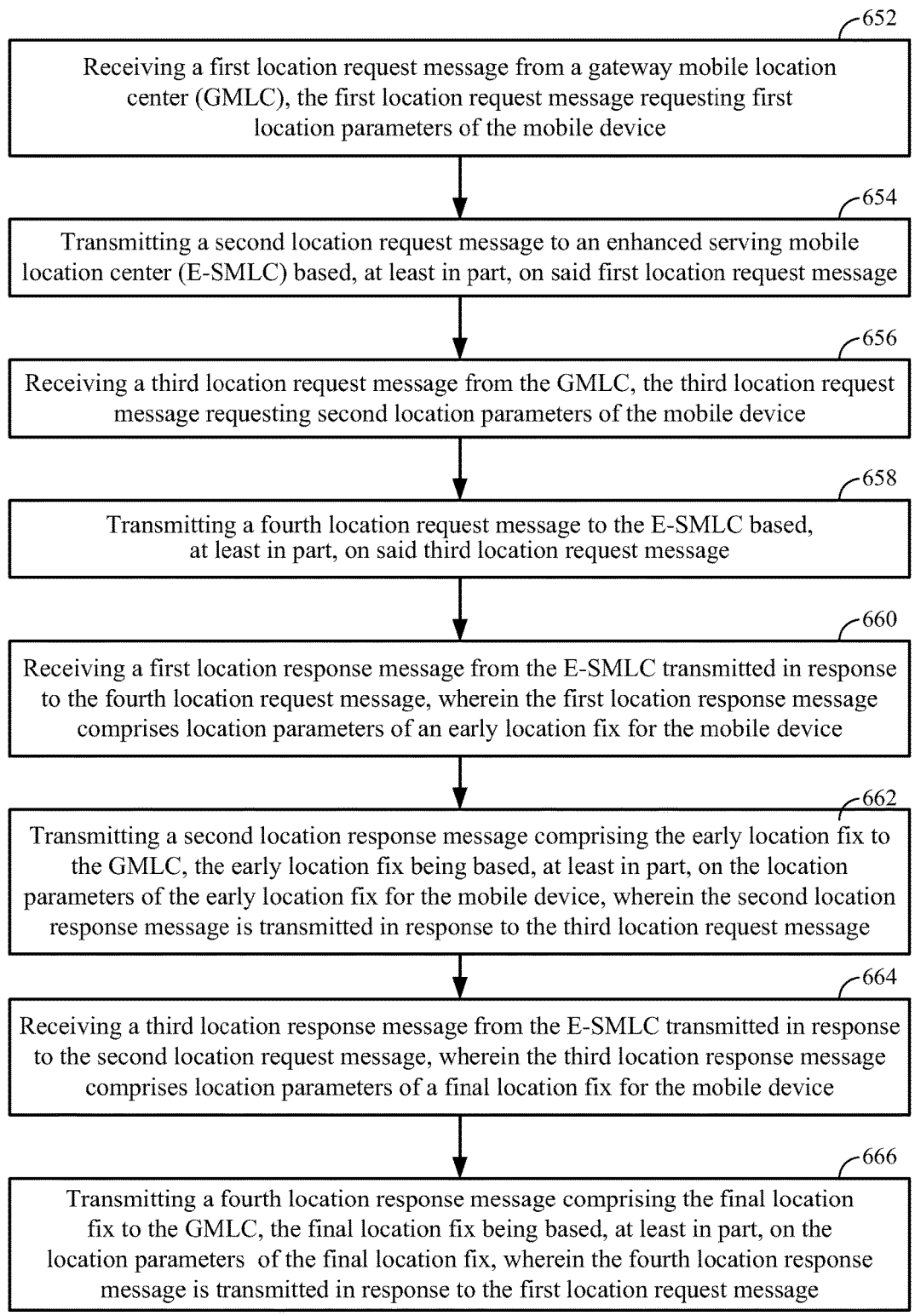
FIG. 14 is a flow diagram of a process to provide early and final position fixes in a control plane in response to an emergency event according to an embodiment.
Figure 15:
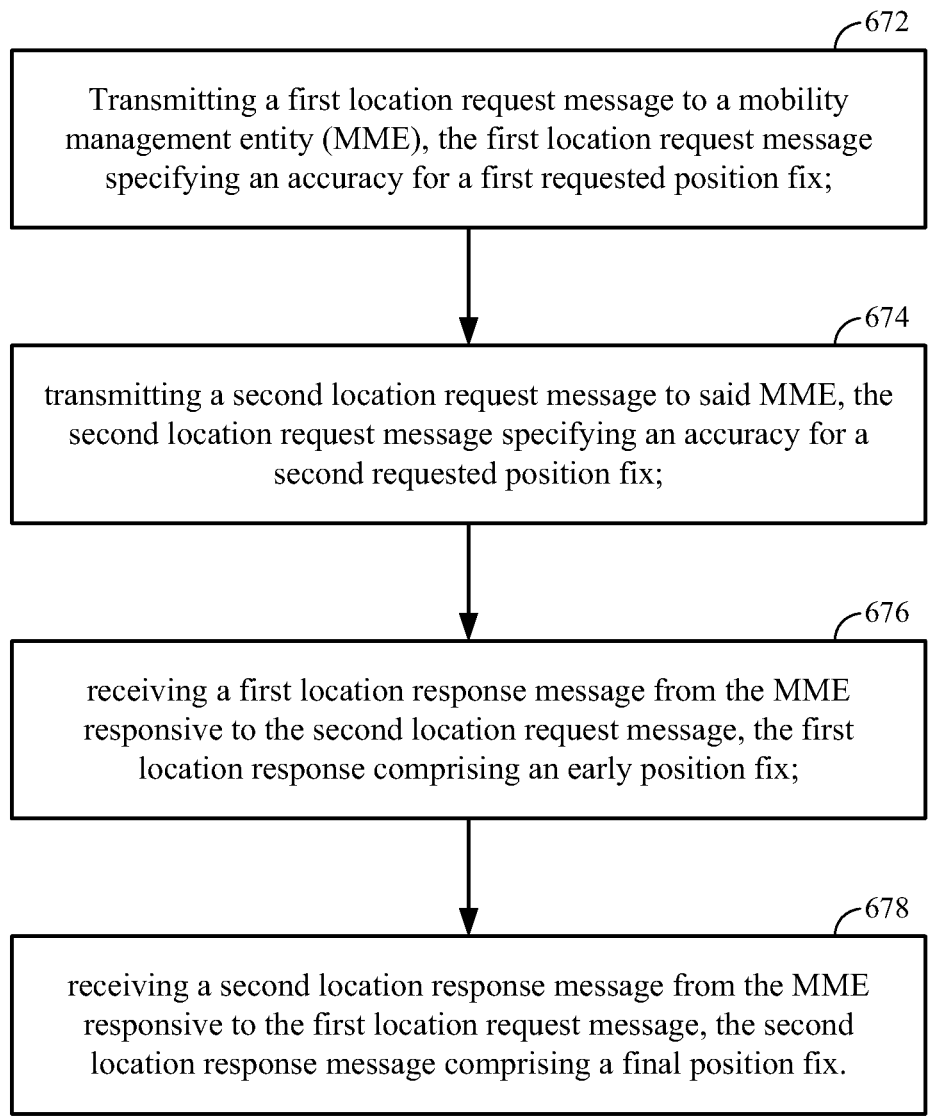
FIG. 15 is a flow diagram of a process of obtaining early and final position fixes in response to separate requests according to an embodiment.

As described earlier, at expiration of a timeout based on responseTimeEarlyFix, if UE 600 did not return an early position fix via LPP messaging, E-SMLC 612 may derive a position fix based on a known cell ID for UE 600. This cellID based position fix may be returned to MME 608/GMLC 610 as an early position fix immediately as requested. FIG. 14 and FIG. 15 are flow diagrams of processes to provide early and final position fixes in a control plane according to particular exemplary embodiment. In one implementation, the processes of FIG. 13B and FIG. 14 may describe actions in connection with the message flow of FIG. 13A and FIG. 13B. For example, actions of the process of FIG. 14 may be performed by an MME (e.g., MME 608) and actions of the process of FIG. 15 may be performed by a GMLC (e.g., GMLC 610).

As illustrated in FIG. 14 and FIG. 15, in response to a request message (e.g., from LRF 615), a GMLC (e.g., GMLC 610) at block 672 may transmit a location request message (e.g., ELP Provide Subscriber Location Request (PSLR) 632) to an MME (e.g., MME 608) specifying an accuracy (e.g., a high accuracy) and/or a tolerance for high delay for a first requested position fix (e.g., final position fix). At block 652, the MME may receive a location request message transmitted at block 672 requesting location parameters of a mobile device. In this context, "location parameters" may include an estimated location of the mobile device, or measurements or other information that may be indicative of the location of the mobile device (e.g., a Cell ID), just to provide a few examples. At block 654, the MME may forward the location request message received at block 652 in a location request message (e.g., LCS-AP Location Req message 636) to an E-SMLC (e.g., E-SMLC 612).

At block 674, the GMLC may transmit a location request message specifying an accuracy (e.g. a low accuracy) and/or a low delay for a second requested position fix (e.g., ELP Provide Subscriber Location Request (ELP PSLR) 634) which may be received by the MME at block 656. At block 658, the MME may forward all or a portion of the request message received at block 656 (e.g., as LCS-AP Loc Req 642) to an E-SMLC (e.g., E-SMLC 612). At block 660, the MME may receive from the E-SMLC an interim location response message (e.g., LCS-AP Loc Resp (early-fix) 644) including location parameters of an early position fix, transmitted in response to the message sent at block 658. At block 662, the MME may forward the location parameters of the early position fix received at block 660 in a location response message to the GMLC (e.g., ELP Provide Subscriber Location Response message 646), in response to the location request message received at block 656. At block 676, the GMLC may receive the location parameters of the early position fix transmitted at block 662 in response to the location request sent at block 674. At block 664, the MME may receive a location response message from the E-SMLC including location parameters of a final position fix for the mobile device (e.g., at LCS-AP Loc Resp (final-fix) message 648), transmitted in response to the message sent at block 654, and may transmit the location parameters of the final position fix to the GMLC at block 666 in a location response message (e.g., in ELP Provide Subscriber Location Response message 649), in response to the location request message received at block 652. At block 678, the GMLC may receive the location parameters of the final location fix transmitted at block 666 in response to the location request sent at block 672.

Figure 16A:
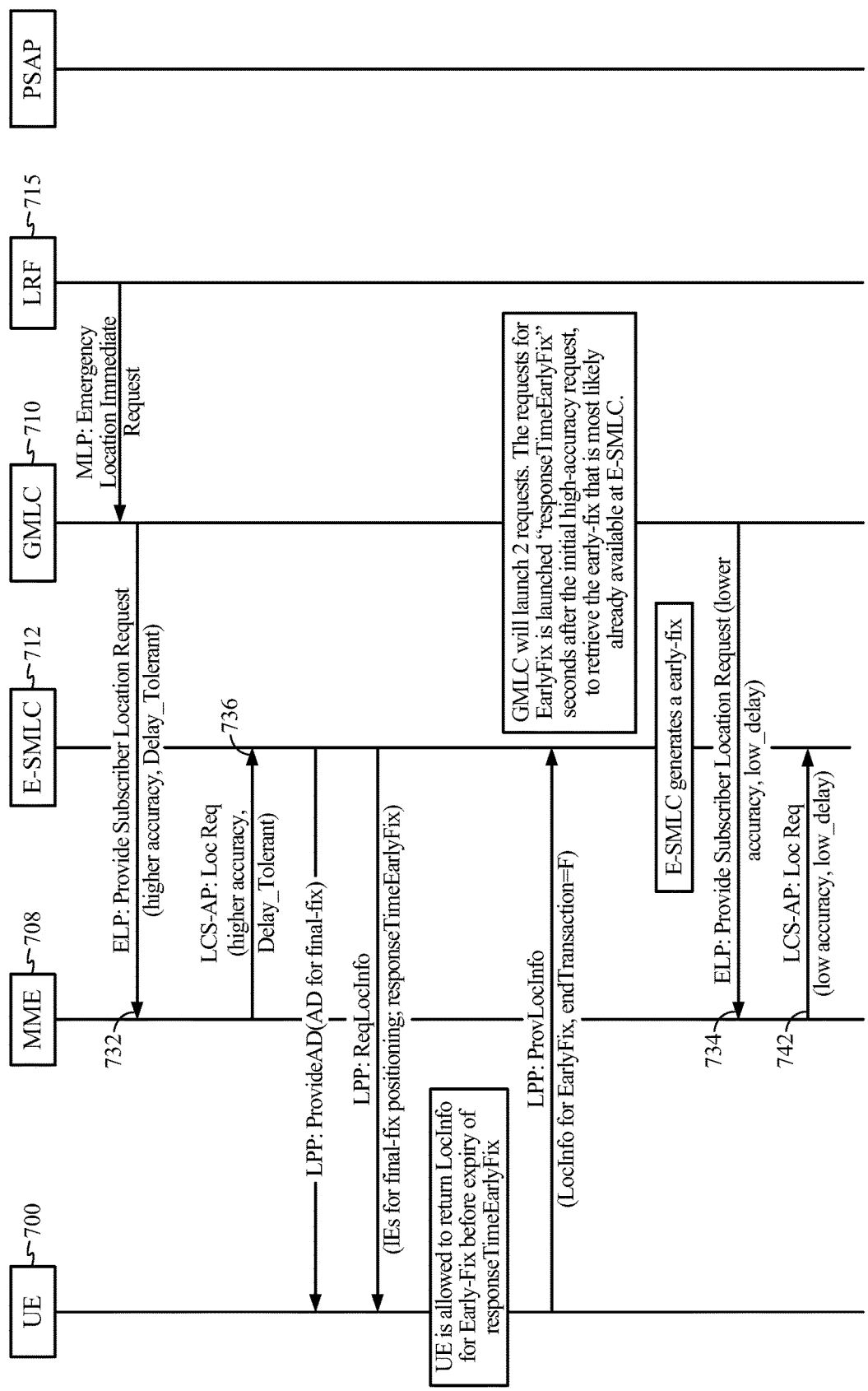
FIG. 16A and FIG. 16B are consecutive message flow diagrams of procedures in a control plane according to an embodiment.
Figure 16B:
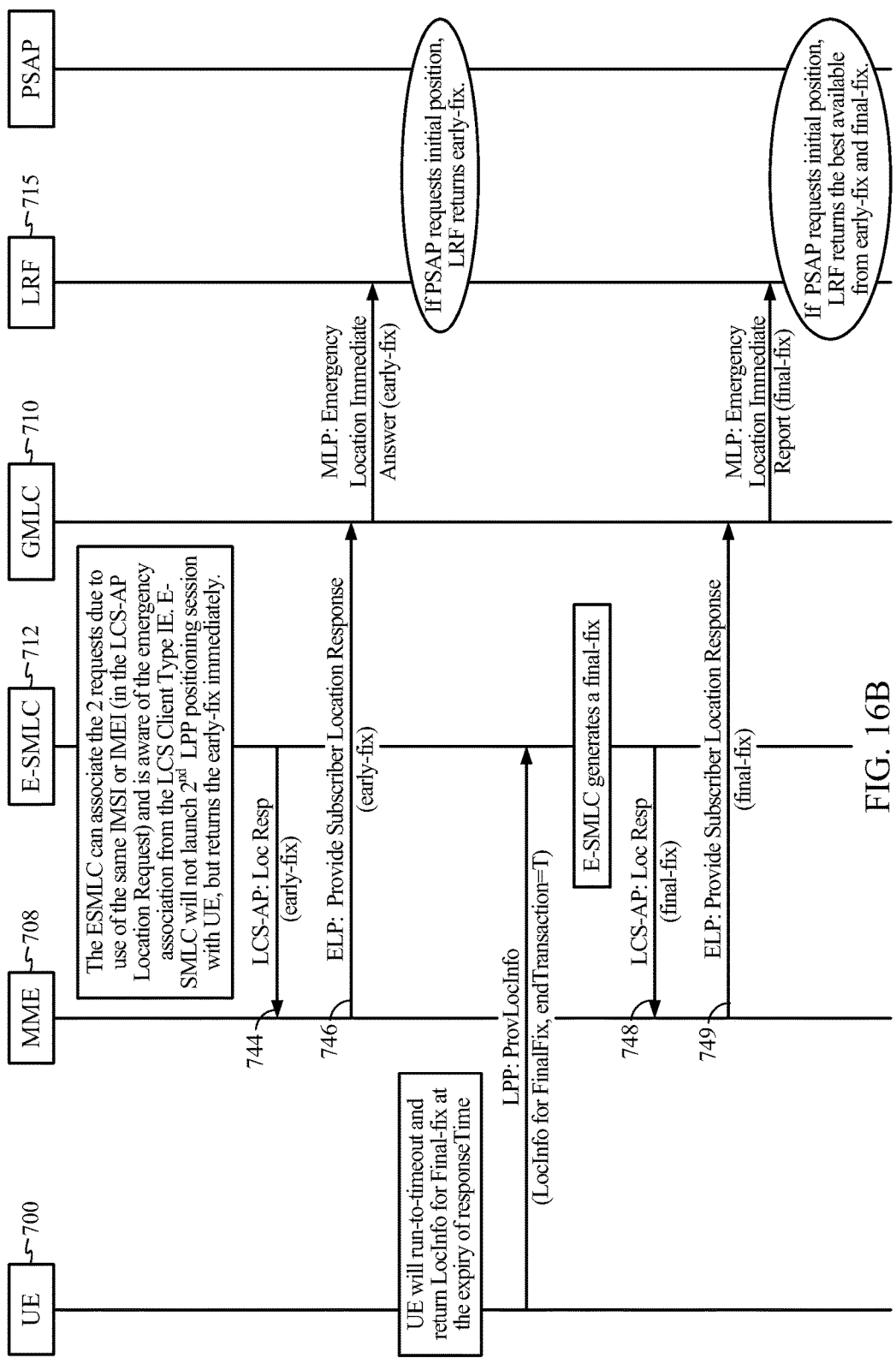

The particular call flow implementation of FIG. 13A and FIG. 13B shows that GMLC 610 may be configured to launch two consecutive ELP PSLRs 632 and 634 in response to receipt of MLP Emergency Location Immediate Request message 631. Here, ELP PSLR message 634 is transmitted shortly after transmission of ELP PSLR message 632. In an embodiment, GMLC 610 may be further configured to defer sending of ELP PSLR message 634 for a low accuracy until the early-fix has most likely become available at E-SMLC 612. FIG. 16A and FIG. 16B show this embodiment in more detail and are based on FIG. 13A and FIG. 13B. In FIG. 16A and FIG. 16B, messages 732, 736, 734, 742, 744, 746, 748 and 749 may correspond, respectively, to messages 632, 636, 634, 642, 644, 646, 648 and 649 in FIG. 13A and FIG. 13B. In addition, LRF 715, GMLC 710, E-SMLC 712, MME 708 and UE 700 in FIGS. 16A and 16B may correspond, respectively, to LRF 615, GMLC 610, E-SMLC 612, MME 608 and UE 600 in FIGS. 13A and 13B. In the embodiment shown in FIG. 16A and FIG. 16B, GMLC 710 may be configured to, after sending the ELP PSLR message 732 for a final-fix, wait "responseTimeEarlyFix" seconds (or a few seconds more than the value of "responseTimeEarlyFix") before sending the ELP PSLR message 734 indicating low accuracy and/or low delay for an early-fix. E-SMLC 712 (which obtains and holds the early-fix) may be able to associate the LCS-AP LocReq message 742 for an early-fix with LCS-AP LocReq message 736 for a final-fix.

The particular embodiment of FIG. 16A and FIG. 16B may be implemented according to further modifications of and/or extensions to LPP as implemented according to FIG. 13A and FIG. 13B. Compared with the approach of FIG.

13A and FIG. 13B, the approach in FIG. 16A and FIG. 16B may enable an E-SMLC (e.g. E-SMLC 712) to respond immediately to a request for an early position fix instead of queuing the request (e.g. as in FIG. 13A and FIG. 13B) until the UE returns the early position fix. This may reduce impacts to the E-SMLC by avoiding the need to queue two requests for a position fix (e.g. one request for a low accuracy early position fix and another request for a high accuracy final position fix). As pointed out above, E-SMLC 712 may associate the two different LCS-AP Loc Req messages 736 and 742 with the same UE 700 if these messages indicate the same IMSI or IMEI and indicate association with an emergency LCS Client (e.g., in an LCS Client Type IE). Thus, if E-SMLC 712 receives the LCS-AP Loc Req message 742 from MME 708, E-SMLC 712 may not launch a second LPP positioning session with UE 700, but may instead return an early position fix immediately (e.g. as obtained previously from UE 700 as an early position fix) in LCS-AP Loc Resp message 744.

In the particular implementations illustrated in FIG. 5, FIG. 6, FIG. 8, FIG. 5, FIG. 13A, FIG. 13B, FIG. 16A and FIG. 16B, a single LPP ReqLocInfo message may be sent specifying positioning requirements for a final position fix. Particular implementations propose an optional IE be added to indicate a request for an additional early position fix and a desired response time for the early position fix. A UE may be permitted to return best-available location information (e.g. location related measurements or a location estimate) for the early position fix, using all or some of the positioning methods allowed for the final position fix. However, if it is desired that an early-fix is to be obtained via positioning methods different from those for the final position fix, e.g. A-GNSS for final position fix (with responseTime=20.0 sec), OTDOA for early position fix (with responseTime=5.0 sec), the particular solution described in FIG. 5, FIG. 6, FIG. 8, FIG. 10, FIG. 13A, FIG. 13B, FIG. 16A and FIG. 16B may depend on a particular UE implementation.

Figure 17:
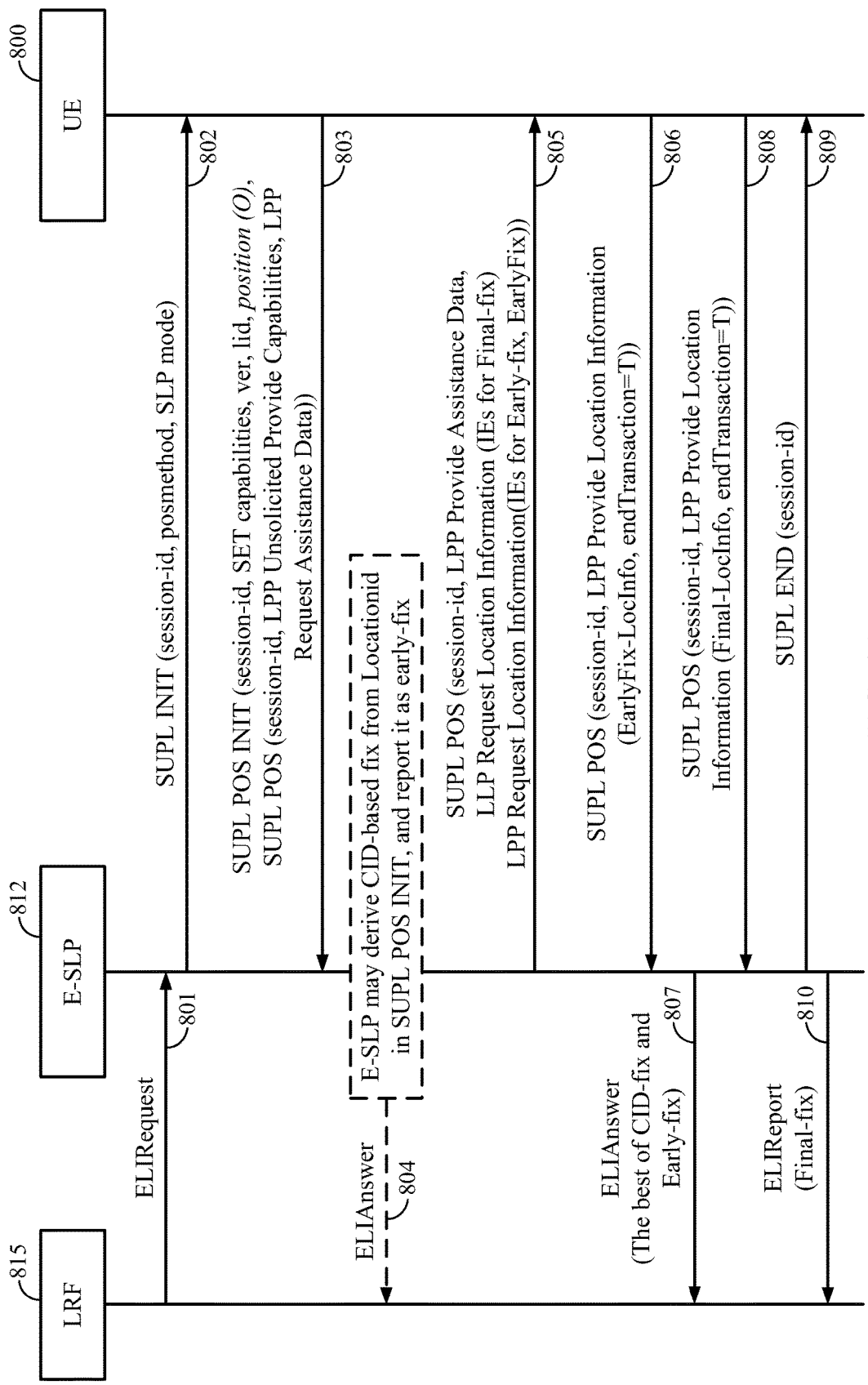
FIG. 17 is a message flow diagram of a procedure to provide an early position fix and a final position fix in response to a single request message in a user plane according to an embodiment.
Figure 18A:
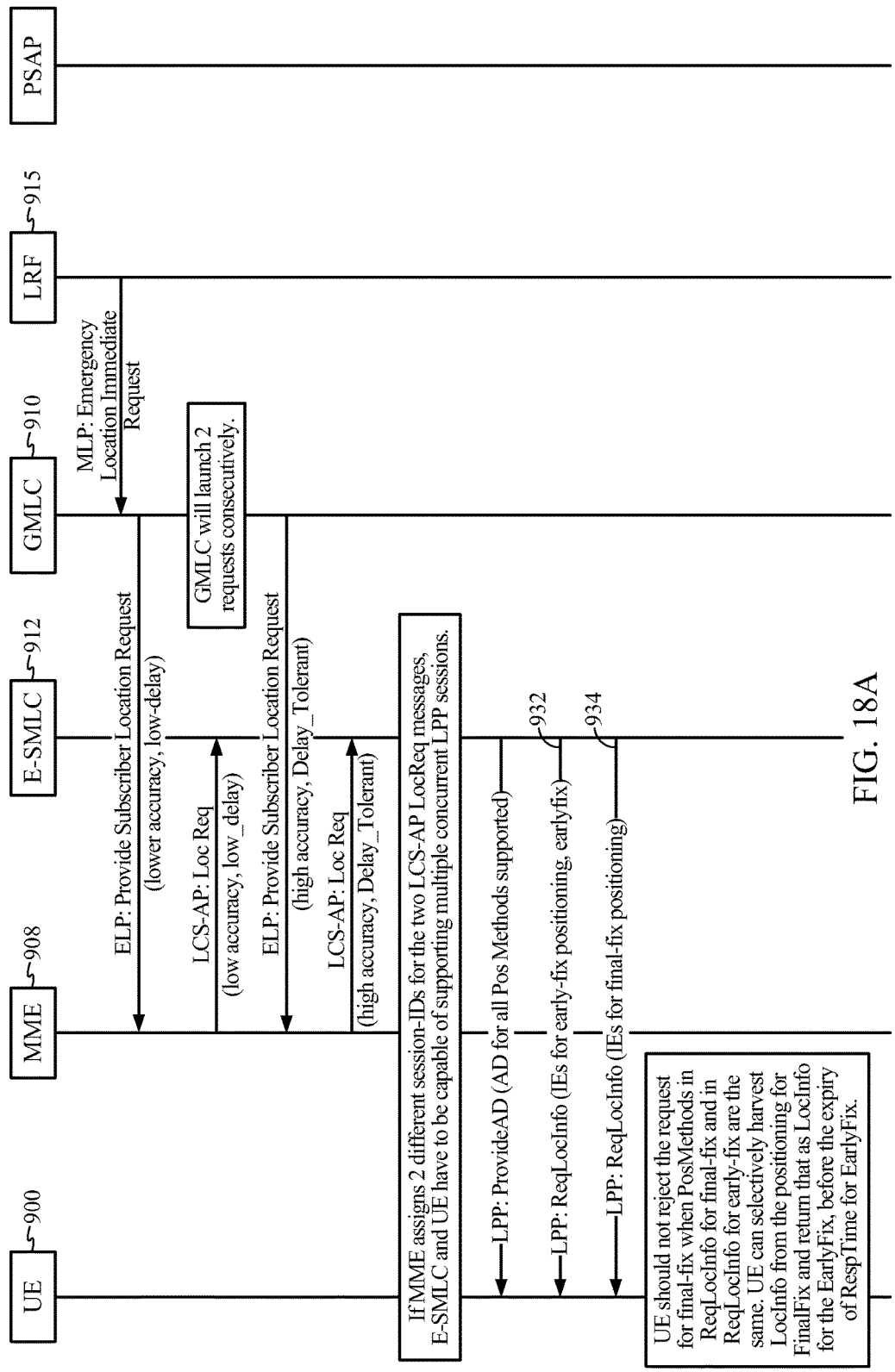
FIG. 18A and FIG. 18B are consecutive message flow diagrams of a procedure to provide an early position fix and a final position fix in response to multiple request messages in a control plane according to an embodiment.
Figure 18B:
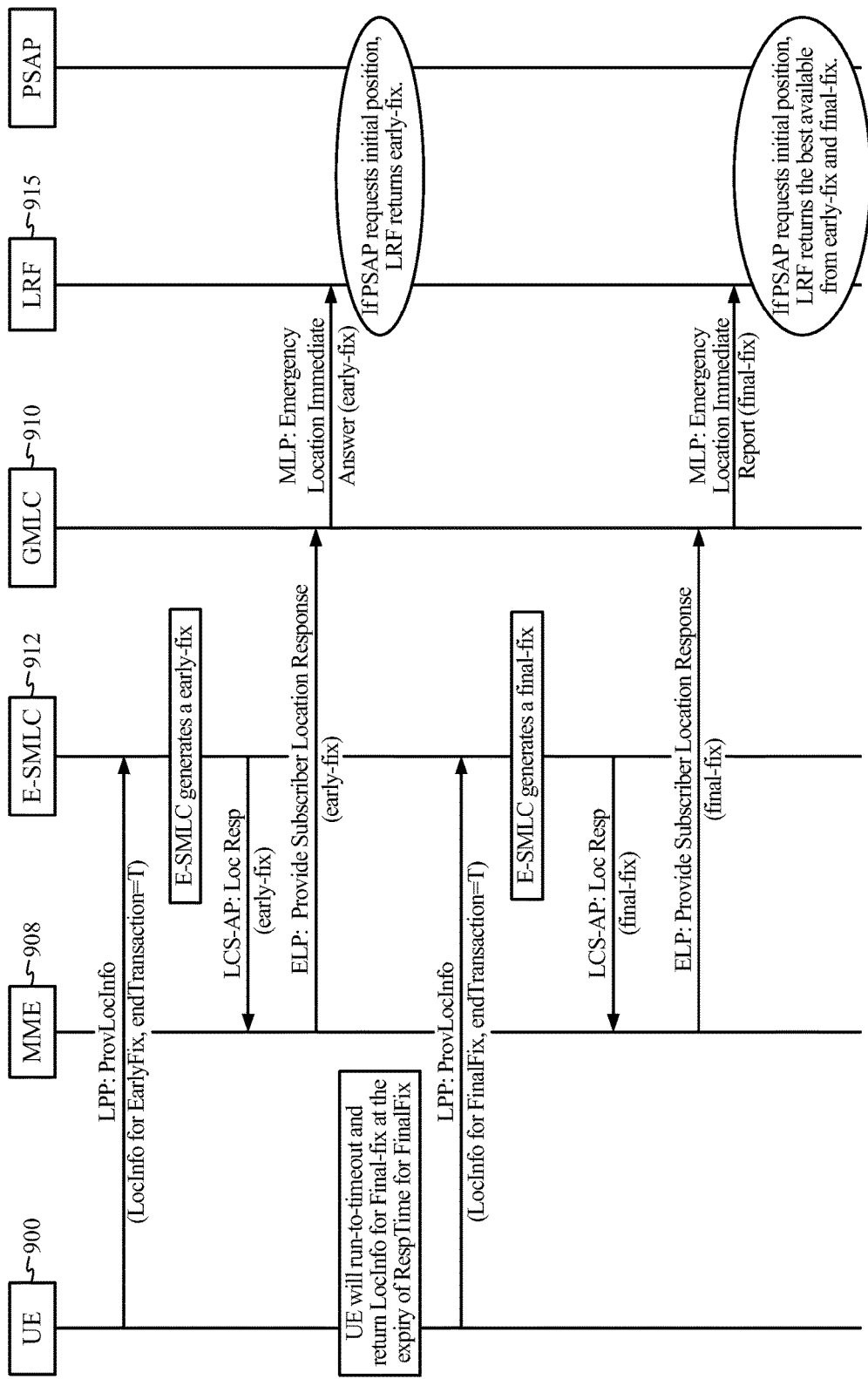

Embodiments discussed above are directed to location request messages specifying an accuracy or a level of delay tolerance in connection with a requested position fix. Implementations according to FIG. 17, FIG. 18A and FIG. 18B further enable a location request message to further specify particular techniques that are to be used in obtaining a requested position fix. FIG. 17 is a call flow diagram that may be implemented using a user plane location solution according to an embodiment to allow for greater flexibility in specifying positioning techniques in obtaining an early position fix. Similarly, FIG. 18A and FIG. 18B show a call flow diagram that may be implemented using a control plane location solution according to an embodiment to allow for greater flexibility in specifying positioning techniques in obtaining an early position fix. In FIG. 17, FIG. 18A and FIG. 18B, a UE (e.g., UE 800 or UE 900) may receive two separate LPP ReqLocInfo messages. In FIG. 17, for example, UE 800 receives two LPP Request Location Information messages encapsulated in SUPL POS message 805 specifying parameters for an early position fix and a final position fix. In FIG. 18A and FIG. 18B, UE 900 may receive LPP ReqLocInfo messages 932 and 934 specifying parameters of an early position fix and a final position fix, respectively. These implementations may allow a location server (e.g., E-SLP 812 or E-SMLC 912) to specify different positioning requirements for an early position fix and for a final position fix.

However, such requirements may stress resources of a UE and other participating network nodes for concurrent support of multiple positioning sessions (e.g., involving multiple UEs). In a particular implementation, an alternative solution may entail an extension of and/or modification to LPP. Here, an LPP Request Location Information message (e.g., LPP: ReqLocInfo messages 932 or embedded in SUPL POS message 805) may carry a new optional IE (e.g., an earlyFix flag) that explicitly differentiates requests for an early position fix and for a final position fix. For example, UE 900 may follow the requirements set forth in LPP ReqLocInfo message 932 (with earlyFix flag) to obtain OTDOA measurements and possibly return an early position fix in less than 5.0 seconds. UE 900 may then follow requirements in LPP ReqLocInfo message 934 (which does not have an earlyFix flag) to obtain a position fix using A-GNSS measurements and return a final position fix at the expiry of a timer (e.g., 20-second timer), for example. UE 800 may respond similarly to LPP Request Location Information messages embedded in SUPL POS message 805.

In any of the particular embodiments described above in connection with FIG. 5, FIG. 6, FIG. 8, FIG. 10, FIG. 13A, FIG. 13B, FIG. 16A, FIG. 16B, FIG. 17, FIG. 18A and FIG. 18B a UE may transmit to a server (e.g., E-SMLC or SLP) an indication as to whether the UE is capable of providing an early position fix (e.g., in an LPP message or other message). In a particular implementation, for example, a UE may include a flag in an LPP Provide Capabilities message (not shown) indicating the UE is capable of providing an early position fix. Transmission of such an LPP Provide Capabilities message may precede a request for location information from a location server. The location server may then know, for example, whether a particular UE is capable of providing an early position fix when a location request is later sent to the UE by the location server.

Figure 19:
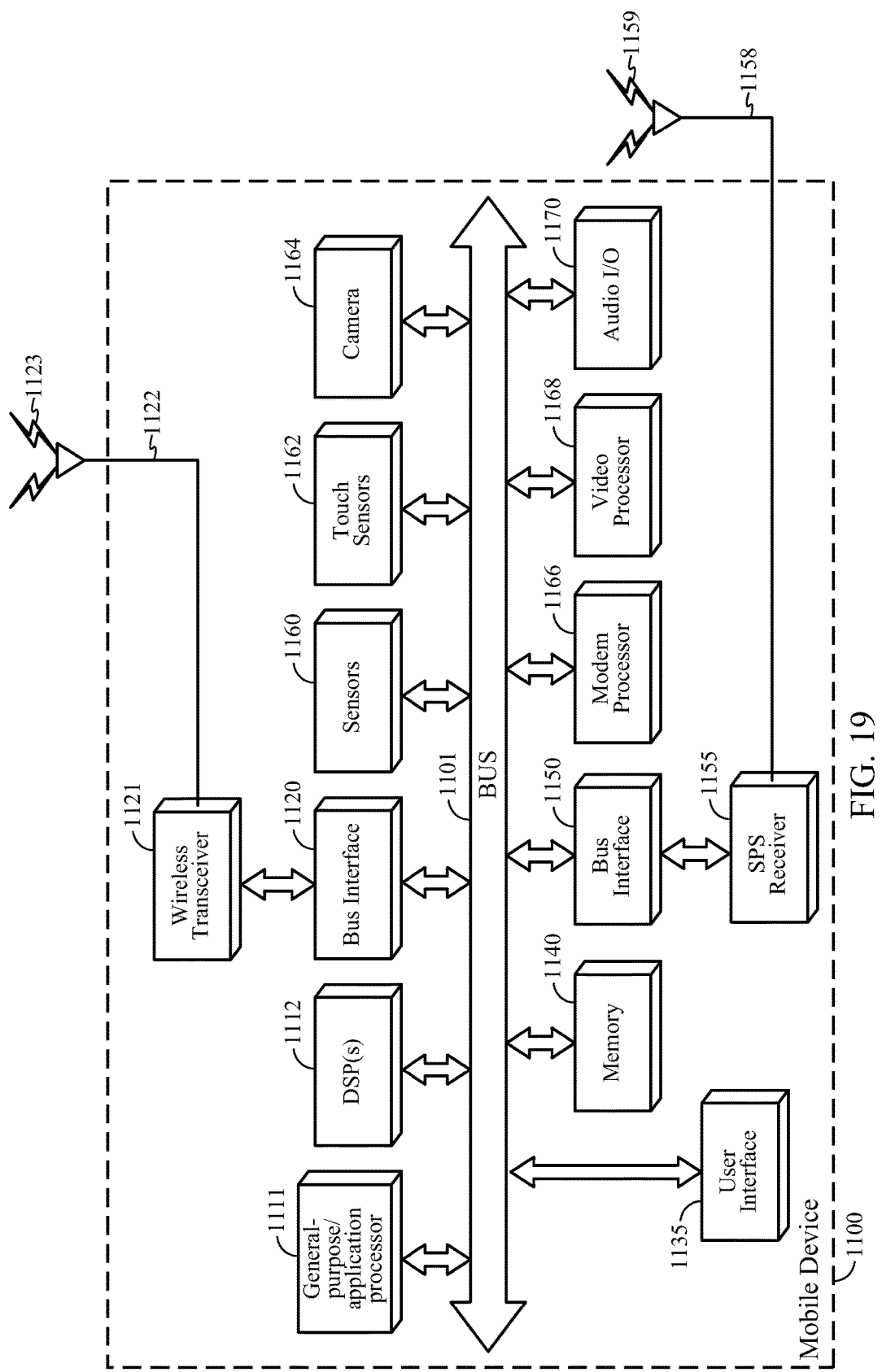
FIG. 19 is a schematic block diagram illustrating an exemplary device, in accordance with an implementation.

FIG. 19 is a schematic diagram of a mobile device 1100 such as a mobile device (e.g., mobile device 100), mobile station, UE (e.g., UE 200), subscriber equipment (SET) or Target device shown in FIG. 1-FIG. 18B according to an embodiment. Mobile device 1100 may include one or more features of a mobile device, UE, SET or Target device depicted and described in association with FIG. 1-FIG. 18B. In certain embodiments, mobile device 1100 may comprise a wireless transceiver 1121 which is capable of transmitting and receiving wireless signals 1123 via wireless antenna 1122 over a wireless communication network; for example, wireless transceiver 1121 may be used to establish communication to an LS (e.g., LS 206) and/or other entities, via an eNB (e.g., eNB 205) and other network infrastructure. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to corresponding multiple wireless communication standards such as, for example, versions of IEEE Std. 802.11, CDMA, WCDMA, LTE, UMTS, GSM, AMPS, ZigBee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1100. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals (e.g., signals acquired from wireless transceiver(s) 1121) for use in performing positioning operations may be performed in memory 1140 or registers (not shown). As such, general-purpose processor(s) 1111, memory 1140, DSP(s) 1112 and/or specialized processors may provide a positioning engine for use in processing measurements to estimate a location of mobile device 1100.

Also shown in FIG. 19, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

Also shown in FIG. 19, a user interface 1135 may comprise any one of several devices such as, for example, a speaker, microphone, display device, vibration device, keyboard, touch screen, just to name a few examples. User interface may instead be supported via TCP/IP or other means to a remote user (e.g. a user accessing an HMS). In a particular implementation, user interface 1135 may enable a user or an O&M system such as an HMS to interact with one or more applications hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user.

Mobile device 1100 may also comprise environment sensors 1160, such as for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose application processor 1111 in support of one or more applications such as, for example, applications directed to positioning or navigation operations. Sensors 1160 may be used to help determine the location of mobile device 1100 and/or to provide information to an HMS or SAS to assist in determining location of UEs.

In a particular implementation, mobile device 1100 may comprise a dedicated modem processor 1166 capable of performing baseband processing of signals received and down converted at wireless transceiver 1121 or SPS receiver 1155. Similarly, modem processor 1166 may perform baseband processing of signals to be up converted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 20:
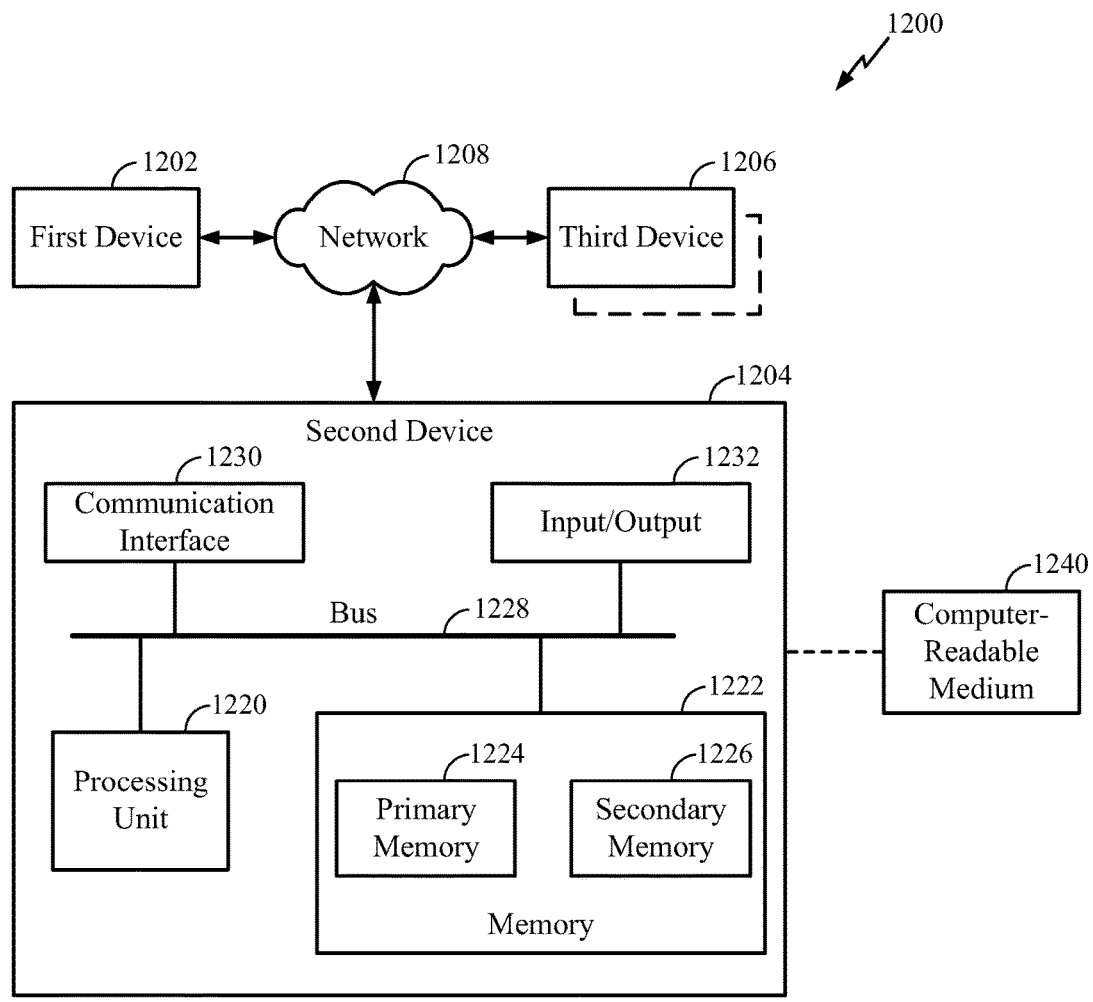
FIG. 20 is a schematic block diagram of an example computing platform in accordance with an implementation.

FIG. 20 is a schematic diagram illustrating an example system 1200 that may include one or more devices configurable to implement techniques or processes described above, for example, in connection with FIGS. 1 to 18B. System 1200 may include, for example, a first device 1202, a second device 1204, and a third device 1206, which may be operatively coupled together through a wireless communications network 1208. In an aspect, second device 1204 may comprise a server such as an MME, E-SMLC, GMLC, LRF, PSAP, LS or E-SLP as depicted in FIG. 2-FIG. 18B. Also, in an aspect, wireless communications network 1208 may comprise one or more wireless access points, for example.

First device 1202, second device 1204 and third device 1206, as shown in FIG. 20, may be representative of any device, appliance or machine that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, or a mobile device in accordance with the examples described herein.

Similarly, wireless communications network 1208 (e.g., in a particular of implementation of network 130 shown in FIG. 1), may be representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

In a particular implementation, a digital map of an indoor area may be stored in a particular format in memory 1222. Processing unit 1220 may execute instructions to processes the stored digital map to identify and classify component areas bounded by a perimeter of structures indicated in the digital map. As pointed out above, these executed instructions may specify identifying and characterizing egress segments in structures forming a perimeter bounding a component area and classifying the bounded component area based, at least in part, on a proportionality of a size of at least one identified egress segment to a size of at least one dimension of the bounded component area.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1230 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, microcontrollers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a code division multiple access ("CDMA") cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method for supporting location services at a mobile device comprising:
   receiving, by the mobile device, a first message from a location server, wherein the first message comprises:
      a request for an early position fix comprising a first response timer value indicating a first time by which the early position fix is to be transmitted from the mobile device to the location server, and
      a second response timer value indicating a second time by which a final position fix is to be transmitted from the mobile device to the location server;
   transmitting a second message comprising first location parameters for the early position fix to the location server at or before expiration of the first response timer value and in response to the first message; and
   transmitting a third message comprising second location parameters for the final position fix to the location server at or before expiration of the second response timer value and in response to the first message.

2. The method of claim 1, wherein the location server comprises an Emergency Secure User Plane Location (SUPL) Location Platform (E-SLP).

3. The method of claim 1, wherein the location server comprises an enhanced serving mobile location center (E-SMLC).

4. The method of claim 1, wherein the first message, the second message and the third message are transmitted according to the 3rd Generation Partnership Project (3GPP) Long Term Evolution (LTE) Positioning Protocol (LPP).

5. The method of claim 4, wherein the first message, the second message and the third message belong to the same LPP transaction.

6. The method of claim 1, wherein the first location parameters comprise an estimated location of the mobile device or measurements indicative of a location of the mobile device or combination thereof.

7. The method of claim 1, wherein the second location parameters comprise an estimated location of the mobile device or measurements indicative of a location of the mobile device or combination thereof.

8. A mobile device to support location services comprising:
   a transceiver device for wirelessly transmitting messages to and wirelessly receiving messages from a communication network; and
   one or more processors configured to:
   obtain a first message received at said transceiver device from a location server, wherein the first message comprises:
      a request for an early position fix comprising a first response time and a second response time;
   initiate transmission of a second message through said transceiver device comprising first location parameters for the early position fix to the location server at or before the first response time and in response to the first message; and
   initiate transmission of a third message through said transceiver device comprising second location parameters for a final position fix to the location server at or before the second response time and in response to the first message.

9. The mobile device of claim 8, wherein the first message, the second message and the third message are transmitted according to the 3rd Generation Partnership Project (3GPP) Long Term Evolution (LTE) Positioning Protocol (LPP).

10. The mobile device of claim 9, wherein the first message, the second message and the third message belong to the same LPP transaction.

11. A non-transitory storage medium comprising machine-readable instructions stored thereon which are executable by a special purpose computing apparatus to:
process a first message received by a mobile device from a location server, wherein the first message comprises:
a request for an early position fix comprising a first response timer value indicating a first time interval during which the early position fix is to be transmitted from the mobile device to the location server, and
a second response timer value indicating a second time by which a final position fix is to be transmitted from the mobile device to the location server;
initiate transmission of a second message comprising first location parameters for the early position fix to the location server at or before expiration of the first response timer value and in response to the first message; and
initiate transmission of a third message comprising second location parameters for the final position fix to the location server at or before expiration of the second response timer value and in response to the first message.

12. The non-transitory storage medium of claim 11, wherein the location server comprises an Emergency Secure User Plane Location (SUPL) Location Platform (E-SLP).

13. The non-transitory storage medium of claim 11, wherein the location server comprises an enhanced serving mobile location center (E-SMLC).

14. The non-transitory storage medium of claim 11, wherein the first location parameters comprise an estimated location of the mobile device or measurements indicative of a location of the mobile device or combination thereof.

15. A mobile device to support location services comprising:
means for receiving a first message from a location server, wherein the first message comprises:
a request for an early position fix comprising a first response timer value indicating a first time by which the early position fix is to be transmitted from the mobile device to the location server, and
a second response timer value indicating a second time by which a final position fix is to be transmitted from the mobile device to the location server;
means for transmitting a second message comprising first location parameters for the early position fix to the location server at or before expiration of the first response timer value and in response to the first message; and
means for transmitting a third message comprising second location parameters for the final position fix to the location server at or before expiration of the second response timer value and in response to the first message.

16. The mobile device of claim 15, wherein:
the means for receiving the first message comprises means for receiving the first message according to the 3rd Generation Partnership Project (3GPP) Long Term Evolution (LTE) Positioning Protocol (LPP);
the means for transmitting the second message comprises means for transmitting the second message according to the 3rd Generation Partnership Project (3GPP) Long Term Evolution (LTE) Positioning Protocol (LPP); and
the means for transmitting the third message comprises means for transmitting the third message according to the 3rd Generation Partnership Project (3GPP) Long Term Evolution (LTE) Positioning Protocol (LPP).

17. The mobile device of claim 16, wherein the first message, the second message and the third message belong to the same LPP transaction.

18. The mobile device of claim 15 wherein the second location parameters comprise an estimated location of the mobile device or measurements indicative of a location of the mobile device or combination thereof.

\* \* \* \* \*